US006329040B1

(12) United States Patent
Oshima et al.

(10) Patent No.: US 6,329,040 B1
(45) Date of Patent: *Dec. 11, 2001

(54) DECORATIVE SHEET HAVING THREE-DIMENSIONAL EFFECT

(75) Inventors: Masahiro Oshima; Katsumi Shimizu; Tatsurou Ohtani, all of Higashi Osaka (JP)

(73) Assignee: Meiwa Gravure Co., Ltd., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/188,501

(22) Filed: Nov. 9, 1998

(30) Foreign Application Priority Data

Dec. 26, 1997 (JP) .................................................. 9-361558

(51) Int. Cl.$^{7}$ ........................................................ B32B 3/00

(52) U.S. Cl. .......................... 428/156; 428/167; 428/187; 428/203; 428/212

(58) Field of Search .................................... 428/203, 212, 428/195, 167, 187, 156

(56) References Cited

U.S. PATENT DOCUMENTS 5,866,233 * 2/1999 Oshima et al. ...................... 428/172

FOREIGN PATENT DOCUMENTS 6-143529 4/1994 (JP) .
6-039500 5/1994 (JP) .
2802484 7/1998 (JP) .

OTHER PUBLICATIONS

Unexamined JP patent (English), JP 06–143529–A, May 24, 1994.*

* cited by examiner

*Primary Examiner*—Bruce H. Hess
*Assistant Examiner*—B. Shewareged
(74) *Attorney, Agent, or Firm*—Darby & Darby

(57) ABSTRACT

A decorative sheet of the invention includes designed portions formed by printing or with irregularities respectively on front and back surfaces of a translucent sheet material, so that a pattern having a three-dimensional effect can be formed on the sheet.

20 Claims, 30 Drawing Sheets

DECORATIVE SHEET HAVING THREE-DIMENSIONAL EFFECT

BACKGROUND OF THE INVENTION

The present invention relates to a decorative sheet used as a material for a table cover, a shower curtain, a window decoration sheet, a pouch and the like.

As a decorative substance whose pattern or color is changed depending upon a visual angle or a decorative substance for providing a three-dimensional effect to a plane sheet, a lenticular plate including semicylindrical lenses, namely, convex lenses each having an arch section, is conventionally used.

When a decorative substance like, for example, a post card is produced by using a lenticular plate, it is necessary to make a pitch of a printed material accurately accord with a pitch of the lenticular plate. Therefore, there are problems of very high accuracy required in the production, a high cost and a large percent of defectives.

Also, in general, in order to attain a 3-D (three-dimensional) effect, a three-dimensional image is photographically formed. Therefore, the usage of a lenticular plate is occasionally poor in generality, and merely a comparatively small product can be obtained by using a lenticular plate. Also, photographic paper or the like is necessary for placing a lenticular plate on material paper, and hence, the product is lack of flexibility. Moreover, since a lenticular plate has a structure in which above-mentioned semicylindrical lenses are repeatedly formed, when a soft material is used, a valley portion between the semicylindrical lenses can become a slit line and the product can be easily torn.

BRIEF SUMMARY OF THE INVENTION

The present invention was devised to overcome the aforementioned problems, and the object of the invention is providing a three-dimensional pattern on a plane sheet surface by forming designed portions on front and back surfaces of a translucent sheet material.

The decorative sheet of this invention comprises a first designed portion formed on one surface of a translucent sheet material and having a first pattern repeatedly formed with a predetermined pitch; and a second designed portion formed on the other surface of the translucent sheet material and having a second pattern similar to the first pattern.

Alternatively, the decorative sheet of this invention comprises a first designed portion formed on one surface of a translucent sheet material and having a first pattern repeatedly formed with a predetermined pitch; and a second designed portion formed on the other surface of the translucent sheet material and having a second pattern repeatedly formed with a predetermined pitch.

Accordingly, the decorative sheet can attain a three-dimensional effect in spite of its flatness by using the effect of parallax stereogram.

In the decorative sheet, the first pattern and the second pattern are formed by printing.

Thus, the patterns are formed on the both surfaces by printing, and hence, no slit line is formed, and the decorative sheet is difficult to tear.

In the decorative sheet, the first pattern is formed with irregularities each having a rectangular section, and the second pattern is formed by printing.

Thus, the first pattern is formed with the irregularities, and hence, the three-dimensional effect can be enhanced.

In the decorative sheet, the first pattern and the second pattern are formed with irregularities each having a rectangular section.

Thus, the first and second patterns are formed with the irregularities, and hence, the three-dimensional effect can be further enhanced due to the strong effect of the parallax stereogram.

In the decorative sheet, the second pattern is smaller than the first pattern.

Since the second pattern has a similar shape obtained by reducing the first pattern, when the decorative sheet is seen with the first designed portion disposed in front, a three-dimensional pattern having a depth can be formed thereon.

In the decorative sheet, the second pattern is larger than the first pattern.

Since the second pattern has a similar shape obtained by enlarging the first pattern, when the decorative sheet is seen with the first designed portion disposed in front, a three-dimensional pattern which looks to be formed above the surface can be formed thereon.

In the decorative sheet, the second pattern is formed by printing a moire pattern obtained by using the first pattern.

Since the moire pattern is used as the second pattern, the three-dimensional effect can be further enhanced due to the strong effect of the parallax stereogram.

In the decorative sheet, the first designed portion is obtained by forming the first pattern on one surface of another translucent sheet, and the second designed portion is obtained by forming the second pattern on one surface of still another translucent sheet.

Since the first pattern and the second pattern are thus separately formed, the respective designed portions can be freely combined. Therefore, the thickness of the decorative sheet can be adjusted by using the thicknesses of the sandwiched translucent sheet materials.

In the decorative sheet, the first designed portion is obtained by printing the first pattern on one surface of the translucent sheet material, and the second designed portion is obtained by printing the second pattern on the other surface of the translucent sheet material.

Accordingly, since the decorative sheet can be produced through duplex printing on the translucent sheet material, the number of processes can be reduced.

In the decorative sheet, the first designed portion is obtained by forming irregularities, that is convexities, each having a rectangular section, in the shape of the first pattern in a plan view on one surface of the translucent sheet material, and the second designed portion is obtained by printing the second pattern on the other surface of the translucent sheet material.

Alternatively, in the decorative sheet, the first designed portion is obtained by forming irregularities, each having a rectangular section, in the shape of the first pattern in a plan view on one surface of the translucent sheet material, and the second designed portion is obtained by forming irregularities, each having a rectangular section, in the shape of the second pattern in a plan view on the other surface of the translucent sheet material.

Accordingly, since the first and second designed portions are formed on the front and back surfaces of one translucent sheet material, there is no need to adhere the first and second designed portions to each other.

In the decorative sheet, a predetermined picture is formed on the first designed portion, the second designed portion or a front surface or a back surface of the translucent sheet material.

Since the predetermined picture is thus formed, the three-dimensional effect of the three-dimensional pattern can be further enhanced through perspective with this picture.

The above and further objects and features of the invention will more fully be apparent from the following detailed description with accompanying drawings.

DETAILED DESCRIPTION OF THE INVENTION

Figure 1:
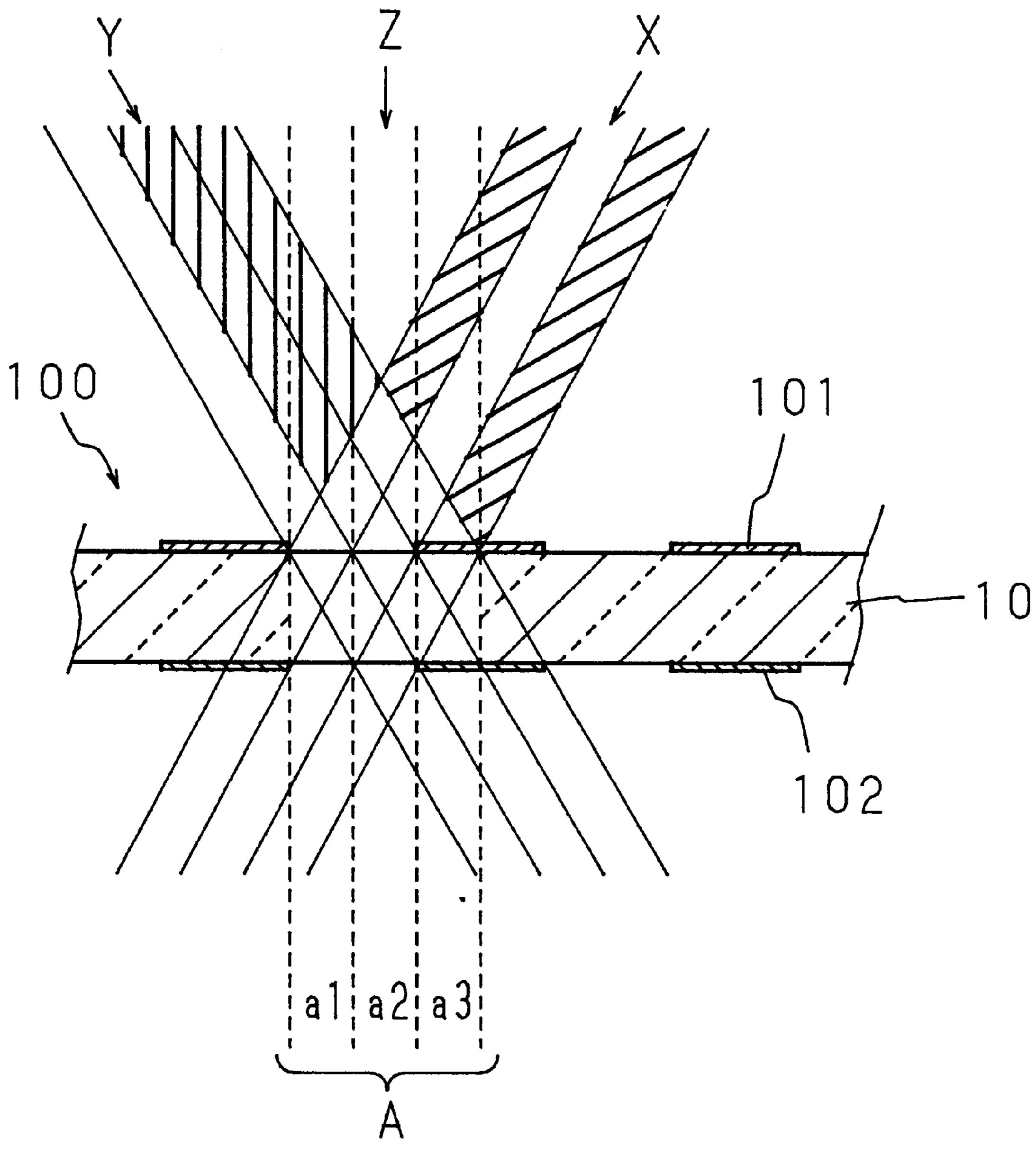
FIG. 1 PRIOR ART
FIG. 1 is a sectional view of a decorative sheet disclosed in Japanese Patent No. 280242484 owned by the present applicant.

A decorative sheet according to this invention comprises designed portions bearing patterns on both surfaces of a translucent sheet, so that the effect of parallax stereogram can be used for providing the plane sheet with a three-dimensional effect. First, the principle of the invention will be described. The present inventor discloses, in Japanese Patent No. 2802484 (Jul. 17, 1998), a decorative sheet, whose pattern and color is changed depending upon a visual angle, obtained by forming colored patterns on both surfaces of a translucent sheet. FIG. 1 is a sectional view of the decorative sheet, disclosed by the present inventor, on both surfaces of which patterns are printed.

The decorative sheet 100 is produced by printing a pattern 101 on the front surface of a translucent sheet material 10 with a predetermined thickness and a pattern 102 on the back surface thereof. When a part A on the decorative sheet 100 is seen from a direction X, an a2 portion looks bright because light is intercepted neither by the pattern 101 nor by the pattern 102, but an a1 portion looks dark because light is intercepted by the pattern 102 and an a3 portion looks also dark because light is intercepted by the pattern 101. Also, when the part A is seen from a direction Y, the a1 portion looks bright but the a2 portion and the a3 portion look dark because light is intercepted. In this manner, in the part A of the decorative sheet 100, bright portions and dark portions vary depending upon the visual angle. Accordingly, when seen with the visual angle continuously changed, the decorative sheet 100 looks to have its pattern and color changed.

Figure 2:
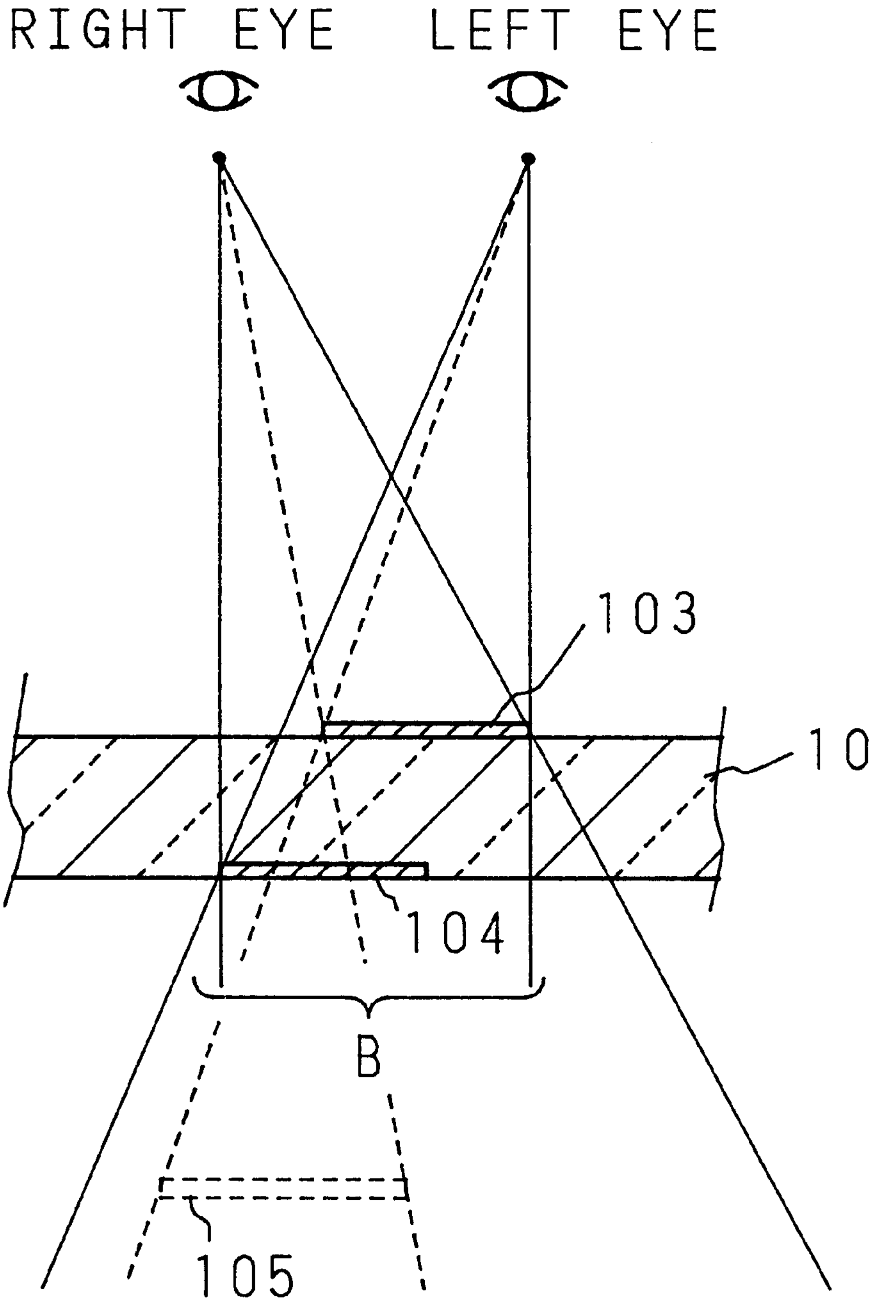
FIG. 2 is a diagram for illustrating parallax stereogram of a decorative sheet according to the invention.

Right and left eyes of a human being see an objective at different angles. FIG. 2 is a sectional view of a decorative sheet of the present invention produced by printing a pattern 103 and a pattern 104 respectively on the front and back surfaces of a translucent sheet material. The patterns 103 and 104 have slightly different dimensions, and are formed in slightly different positions on the respective surfaces. Since the right and left eyes see a part B from different directions, the right eye and the left eye see images at different angles as described above. Specifically, as is shown in FIG. 2, an angle of an overlap between the patterns 103 and 104 seen with the right eye is different from an angle of the overlap seen with the left eye. In the case where such images at different angles are formed as one image in the brain of a human being, an image 105 beyond the decorative sheet is seen when focused behind the sheet and an image above the decorative sheet is seen when focused in front of the sheet. In this manner, owing to the predetermined patterns formed on the both surfaces of the translucent sheet material 10, a three-dimensional pattern can be formed on the plane surface of the decorative sheet.

Now, the present invention will be described with reference to accompanying drawings illustrating embodiments thereof.

Figure 3:
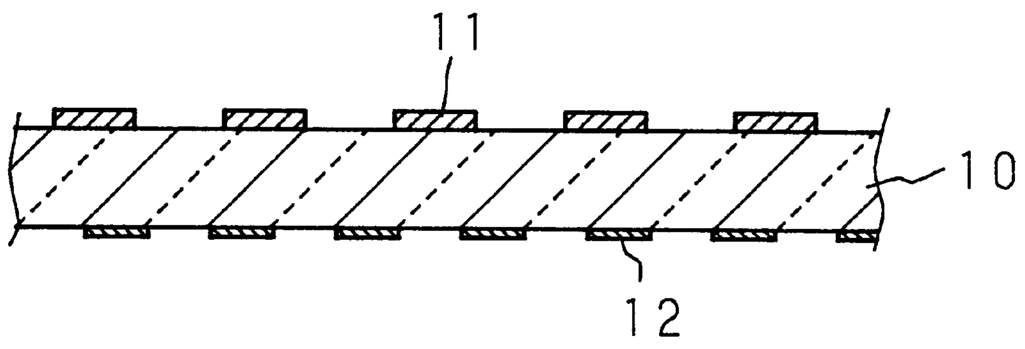
FIG. 3 is a sectional view for showing the structure of a decorative sheet according to a first embodiment of the invention.
Figure 4:
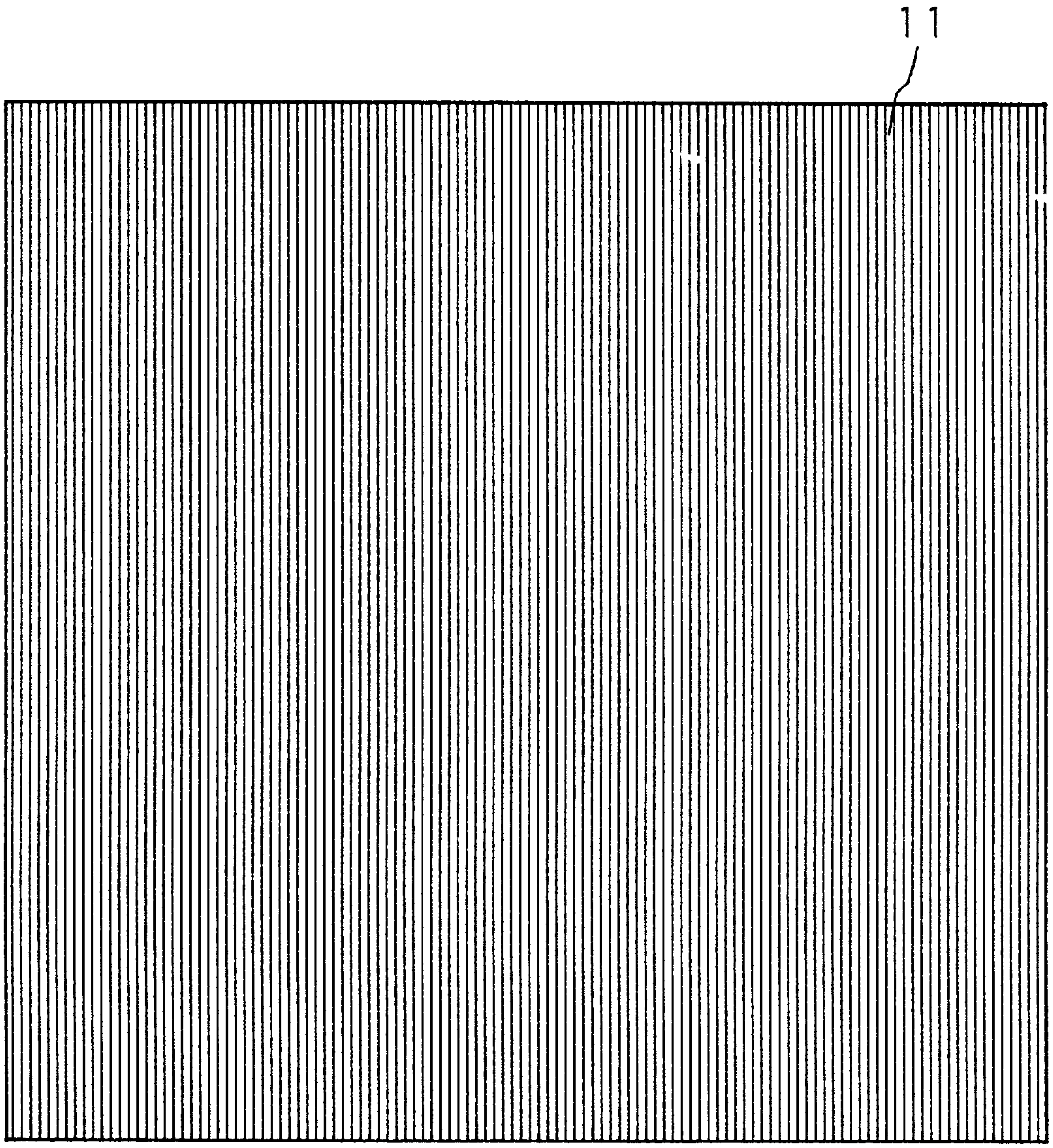
FIG. 4 is an enlarged view of stripes used in the first embodiment.
Figure 5:
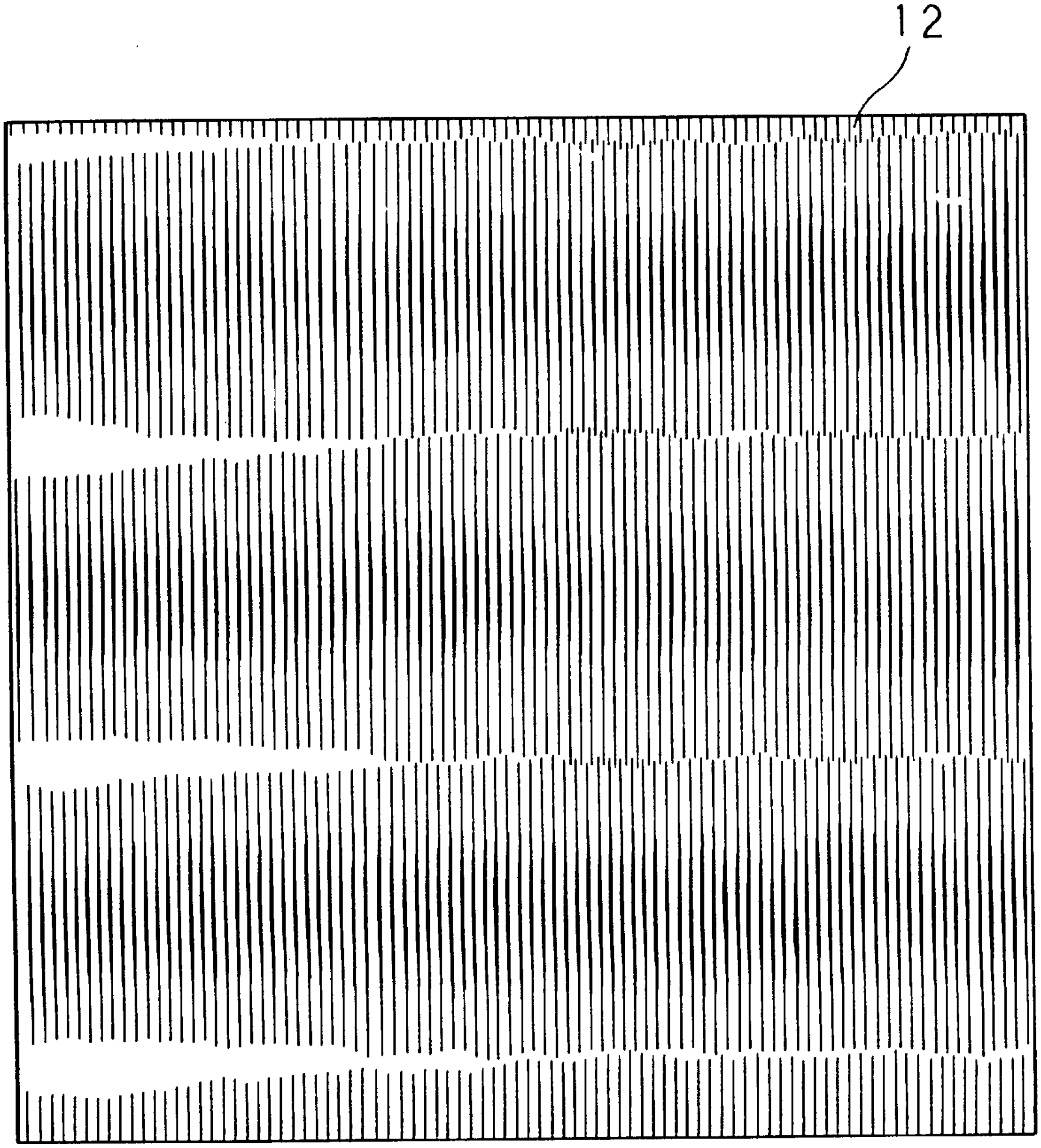
FIG. 5 is an enlarged view of moire fringes used in the first embodiment.

Embodiment 1:

FIG. 3 is a sectional view for showing the structure of a decorative sheet according to a first embodiment of the invention. In FIG. 3, a reference numeral 10 denotes a translucent sheet material having a given thickness, and on the front surface thereof, stripes 11 including a large number of parallel straight lines with a predetermined pitch are printed as a first designed portion. FIG. 4 is an enlarged view of the stripes 11. Also, on the back surface of the sheet material 10, moire fringes 12 obtained by using the stripes 11 on the front surface are printed as a second designed portion. FIG. 5 is an enlarged view of the moire fringes 12. Specifically, the sheet material has a thickness of 0.3 mm, and the line width and the pitch of the stripes 11 are 0.2 mm and 0.4 mm, respectively. Also, the printed moire fringes 12 are a pattern formed by placing stripes obtained by reducing the stripes 11 at a ratio of 98% over the same reduced stripes so as to make the stripes cross one another at 1.5 degrees.

Figure 6:
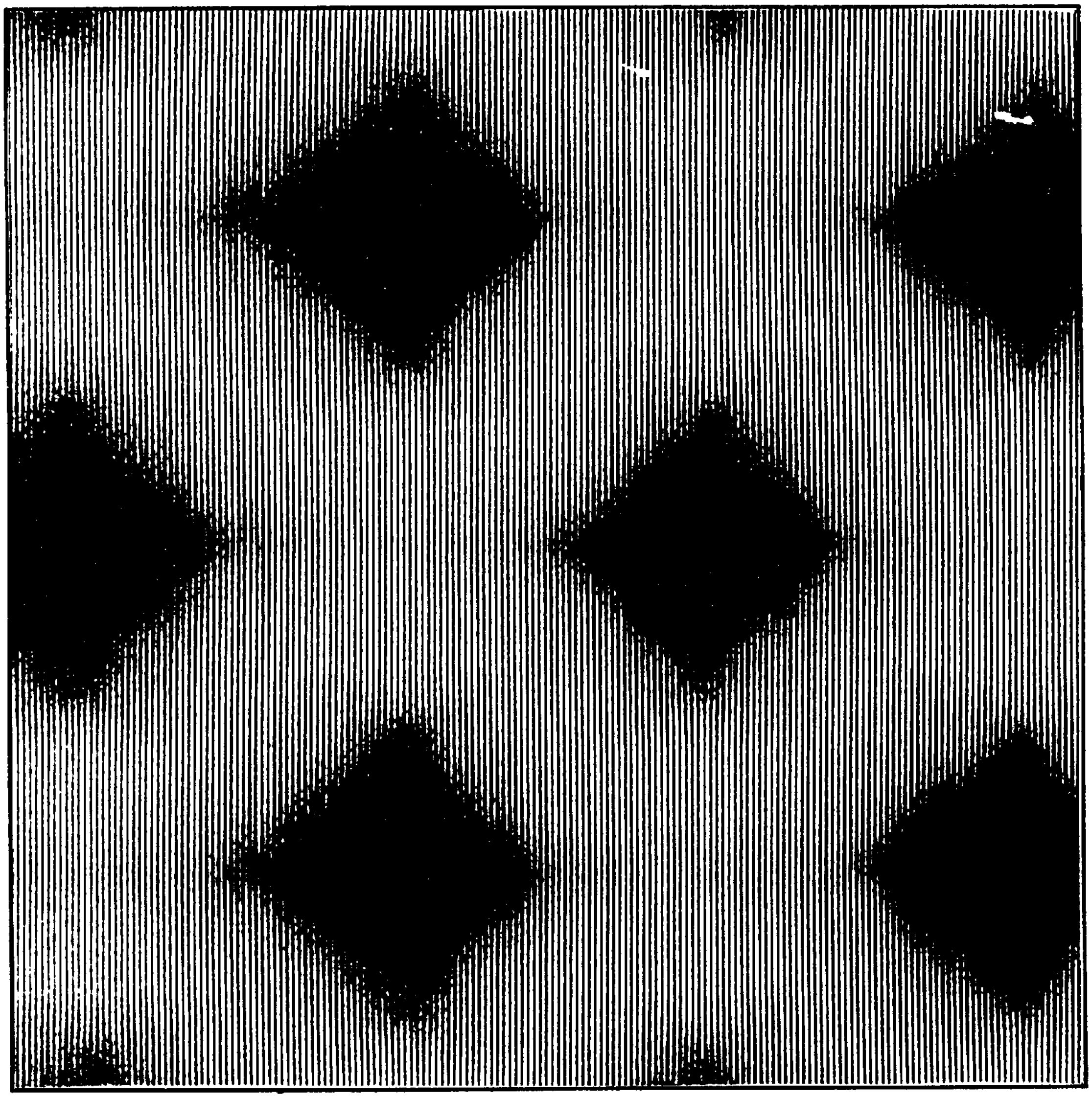
FIG. 6 is an enlarged view of a moire pattern formed in the first embodiment.

When the decorative sheet having this structure is seen from the front or back surface, a latticed moire pattern (or a negative/positive inverted rhombic pattern) is obtained due to the moire phenomenon. FIG. 6 is an enlarged view of this moire pattern. This moire pattern has a depth and looks as if it was formed beyond the surface of the sheet material. Thus, the decorative sheet can attain the three-dimensional effect. It is known that a moire pattern can be obtained when patterns are overlapped. When a pitch of the overlap is varied by reducing or enlarging a pattern on the front surface as compared with a pattern on the back surface, the resultant moire pattern can attain a depth and provide the three-dimensional effect.

Figure 7:
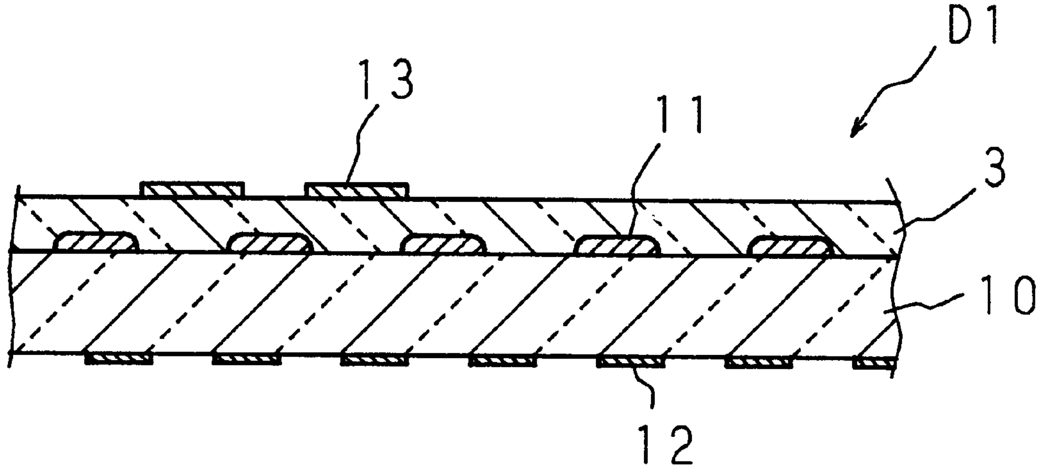
FIG. 7 is a sectional view for showing the structure of a decorative sheet D1 of the first embodiment.
Figure 8:
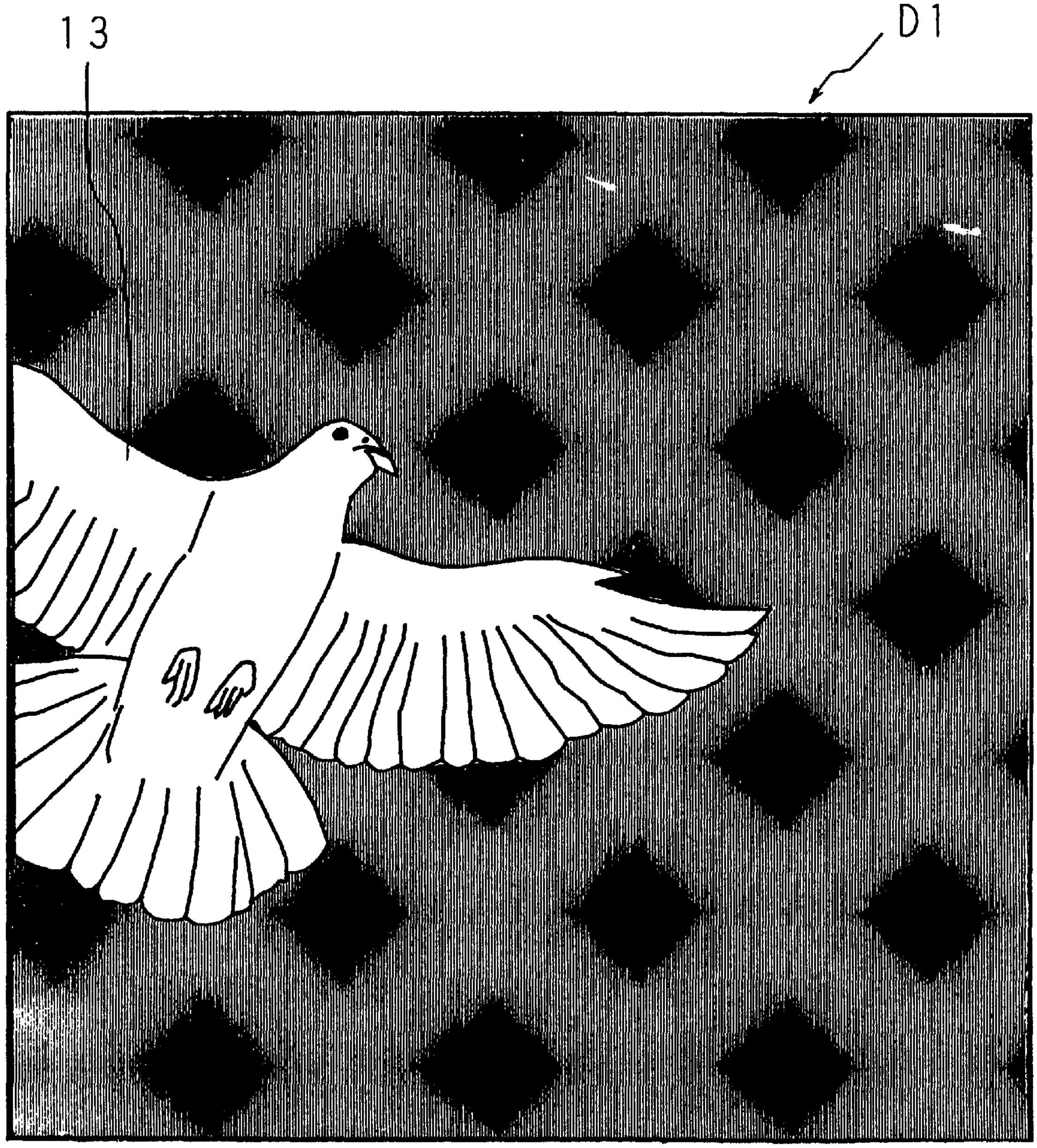
FIG. 8 is a plan view of the decorative sheet of FIG. 7.

Also, a translucent sheet 3 on which a picture 13 of a flapping bird is printed is adhered onto the stripes 11 on the front surface. FIG. 7 is a sectional view for showing the structure of the thus obtained decorative sheet D1, and FIG. 8 is a plan view thereof. In the decorative sheet D1, the picture 13 of the white bird looks to be formed above the moire pattern having the depth and colored in, for example, blue. Thus, the three-dimensional effect is further enhanced, and the decorative sheet can attain very high decorativeness.

Moreover, the back surface of the decorative sheet D1 is coated with an adhesive by a known method, and the decorative sheet D1 is adhered onto a window pane. Thus, the window pane can be provided with the three-dimensional effect due to the rhombic moire pattern, resulting in attaining an effect that the window pane looks to have a depth.

Embodiment 2:

In the above-described first embodiment, the decorative sheet is produced by printing the stripes 11 and the moire pattern 12 on the front and back surfaces of the sheet material 10, respectively. Alternatively, a decorative sheet can be produced by adhering other two translucent sheet materials, on which respective patterns are printed, onto the front and back surfaces of the sheet material 10.

Figure 9:
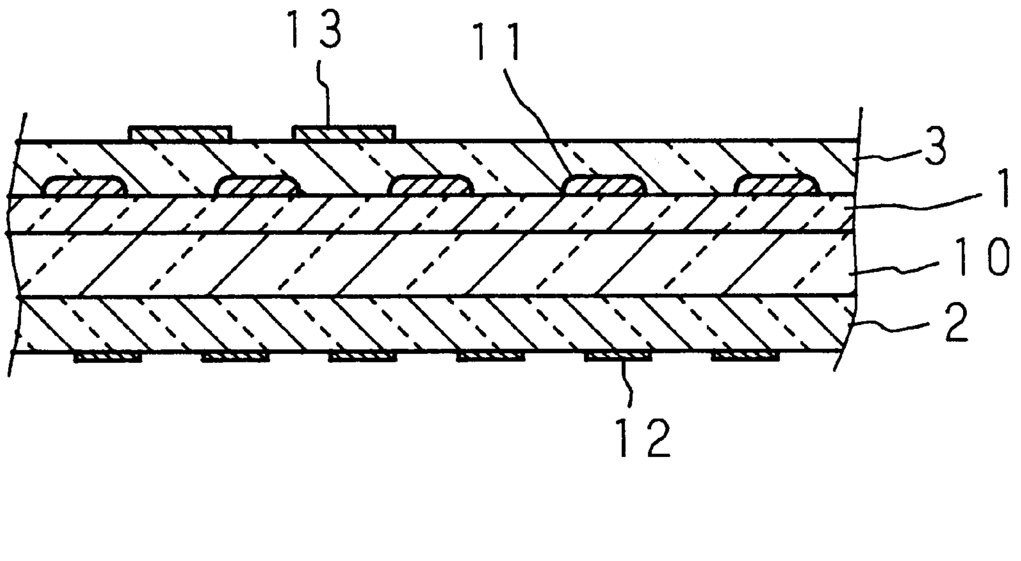
FIG. 9 is a sectional view for showing a decorative sheet according to a second embodiment of the invention.

FIG. 9 is a sectional view for showing the structure of such a decorative sheet. A front sheet material 1 on which stripes 11 are printed is adhered onto the front surface of a sheet material 10, and a back sheet material 2 on which moire fringes 12 are printed is adhered onto the back surface of the sheet material 10. Onto the front sheet material 1, a translucent sheet 3 on which a bird picture 13 is printed is adhered. This decorative sheet also exhibit the three-dimensional effect similarly to the decorative sheet of the first embodiment.

Figure 10:
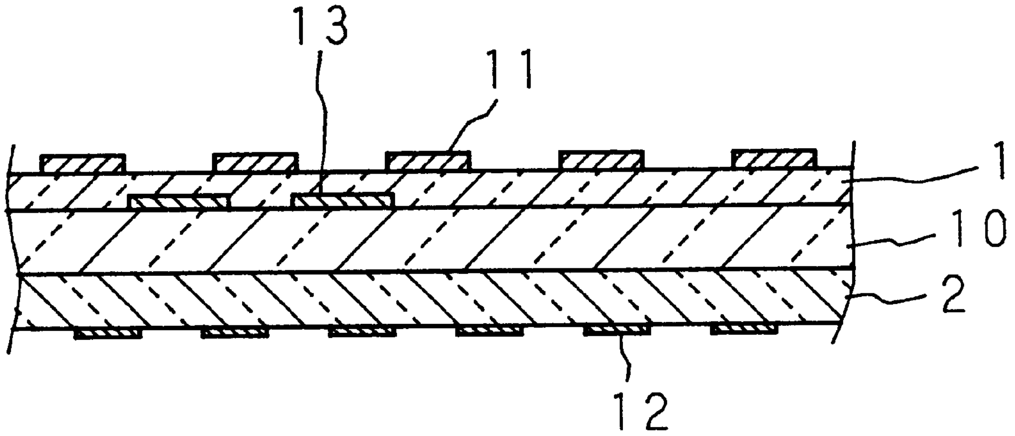
FIG. 10 is a sectional view for showing the structure of another decorative sheet of the second embodiment.

Alternatively, the bird picture 13 can be printed on any surface between the front sheet material 1 and the back sheet material 2. FIG. 10 is a sectional view for showing the structure of such a decorative sheet. The bird picture 13 is printed on the front surface of the sheet material 10 having a given thickness, the front sheet material 1 on which the stripes 11 are printed is adhered onto the surface of the bird picture 13, and the back sheet material 2 on which the moire fringes 12 are printed is adhered onto the back surface of the sheet material 10. This decorative sheet can also provide a pattern having the three-dimensional effect similarly to that of the first embodiment.

Figure 11:
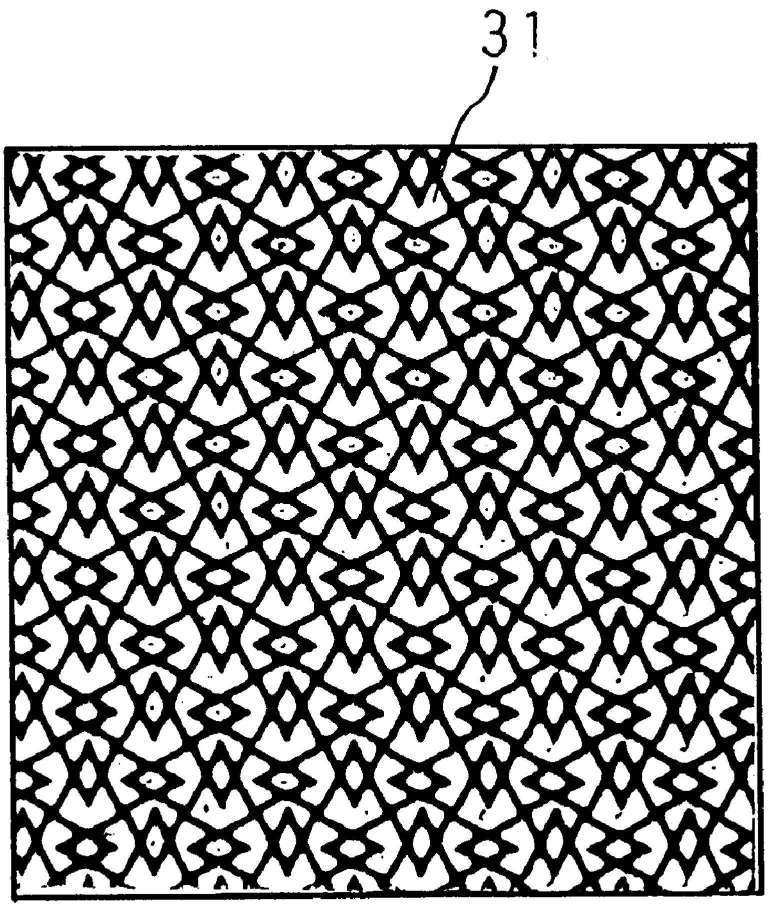
FIG. 11 is an enlarged view of a geometric pattern used in a third embodiment of the invention.
Figure 12:
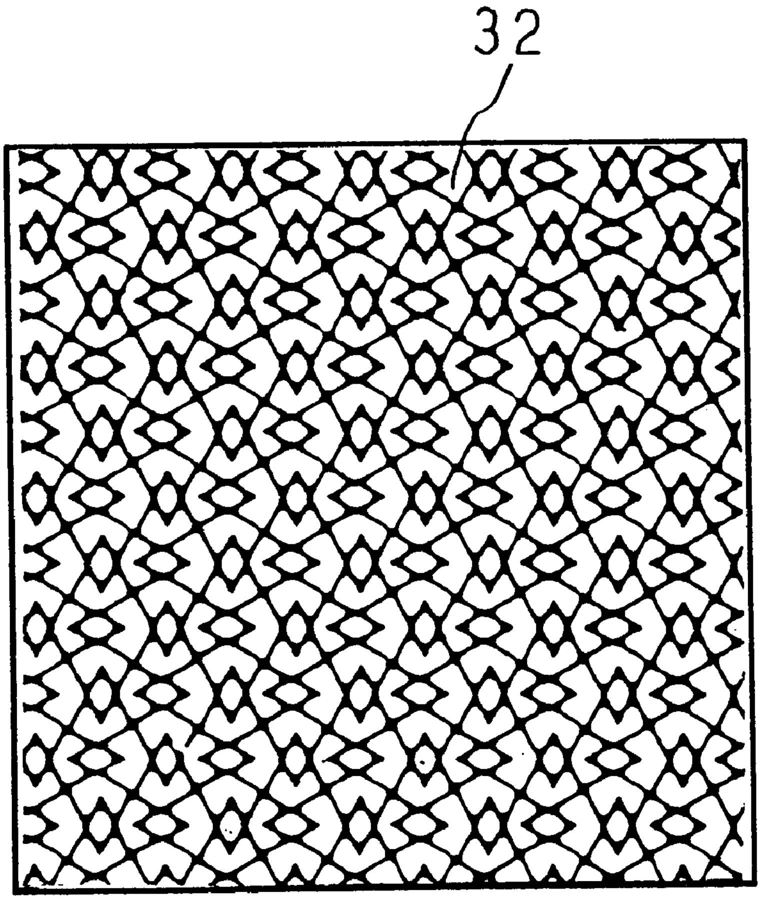
FIG. 12 is an enlarged view of a similar pattern used in the third embodiment.

Embodiment 3:

In the above-described first and second embodiments, the stripes 11 are placed over the moire fringes 12 similar to the stripes 11. In a third embodiment, a geometric pattern 31 in which a combination of plural rhombi in various sizes is repeatedly formed with a constant pitch is placed over a similar pattern 32. A decorative sheet D2 of the third embodiment is produced, similarly to that of the first embodiment shown in FIG. 3, by printing the geometric pattern 31 on the front surface of a translucent sheet material 10 and printing the similar pattern 32 on the back surface thereof. FIG. 11 is an enlarged view of the geometric pattern 31, and FIG. 12 is an enlarged view of the similar pattern 32. Specifically, the sheet material 10 has a thickness of 0.3 mm, and the geometric pattern 31 has a line width of 0.2 mm and a pitch of 0.8 mm. The similar pattern 32 is obtained by reducing the geometric pattern 31 at a ratio of 98%.

Figure 13:
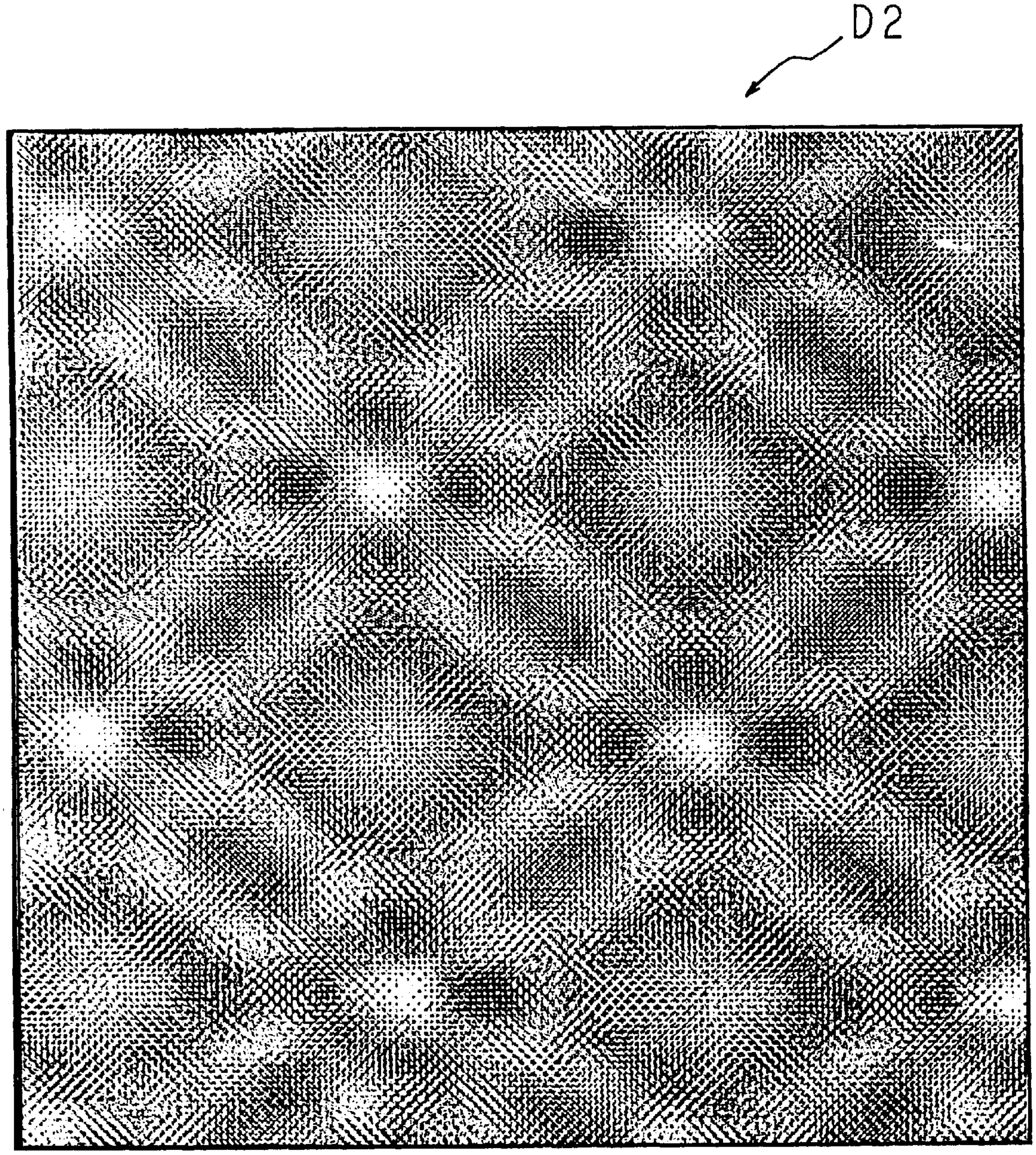
FIG. 13 is a diagram for showing a moire pattern formed in the third embodiment.

When this decorative sheet D2 is seen from the front or back surface, a moire pattern in which a rhombus surrounded by a rectangle is repeated can be obtained due to the moire phenomenon. FIG. 13 is an enlarged view of this moire pattern. This moire pattern looks to have a depth and to be formed beyond the surface of the sheet material 10, and the decorative sheet can thus attain the three-dimensional effect. When a pouch is produced by using this decorative sheet D2, the pouch looks weighty with a touch of a thick material.

Embodiment 4:

The decorative sheet of the third embodiment is produced by printing the geometric pattern 31 and the similar pattern 32 on the front and back surfaces of the sheet material 10, respectively. Alternatively, a decorative sheet can be produced by adhering other translucent sheet materials, on which respective patterns are printed, onto the front and back surfaces of the sheet material 10 as is shown in FIG. 9. Also such a decorative sheet can attain the same three-dimensional effect.

Embodiment 5:

In the above-described third embodiment, the similar pattern 32 is obtained by reducing the geometric pattern 31. In a fifth embodiment, an enlarged similar pattern is used. A decorative sheet of the fifth embodiment is produced, similarly to that of the first embodiment shown in FIG. 3, by printing a geometric pattern 31 on the front surface of a translucent sheet material 10 and printing a similar pattern 32 on the back surface thereof. The geometric pattern 31 used in this embodiment is the same as that shown in FIG. 11. Specifically, the sheet material 10 has a thickness of 0.3 mm, and the geometric pattern 31 has a line width of 0.2 mm and a pitch of 0.8 mm. Furthermore, the similar pattern 32 is obtained by enlarging the geometric pattern 31 at a ratio of 101%.

When this decorative sheet is seen from the front or back surface, a moire pattern in which a rhombus surrounded with a rectangle is repeated can be obtained due to the moire phenomenon. This moire pattern looks to be formed above the surface of the sheet material 10, and the decorative sheet can attain the three-dimensional effect. When a translucent sheet on which a predetermined multicolored picture is printed is placed over the front surface of this decorative sheet, the picture looks to be formed beyond the moire pattern, and the moire pattern looks to be formed further above. When this decorative sheet is used as a shower curtain, the curtain looks gorgeous with the complicated moire pattern providing a touch of thick cloth and with the picture looking to be formed in the depth.

Embodiment 6:

The decorative sheet of the fifth embodiment is produced by printing the geometric pattern 31 and the similar pattern 32 on the front and back surfaces of the sheet material 10, respectively. Alternatively, a decorative sheet can be produced by adhering other translucent sheet materials, on which respective patterns are printed, onto the front and back surfaces of the sheet material 10 as is shown in FIG. 9. Furthermore, when a picture is printed on a surface between the translucent sheet materials on which the respective patterns are printed, the same effect can be attained.

Figure 14:
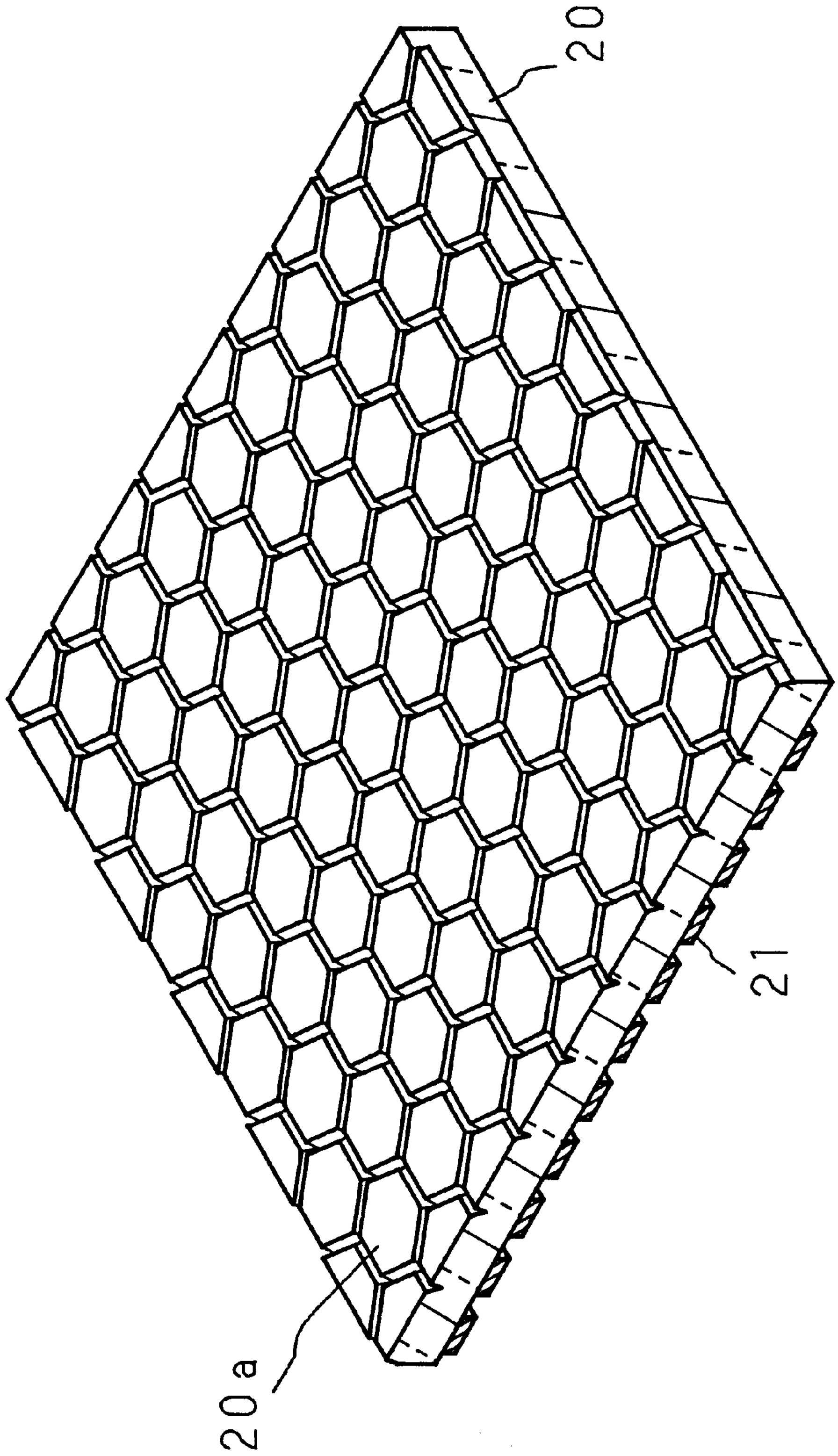
FIG. 14 is an enlarged perspective view for showing the structure of a decorative sheet according to a seventh embodiment of the invention.
Figure 15:
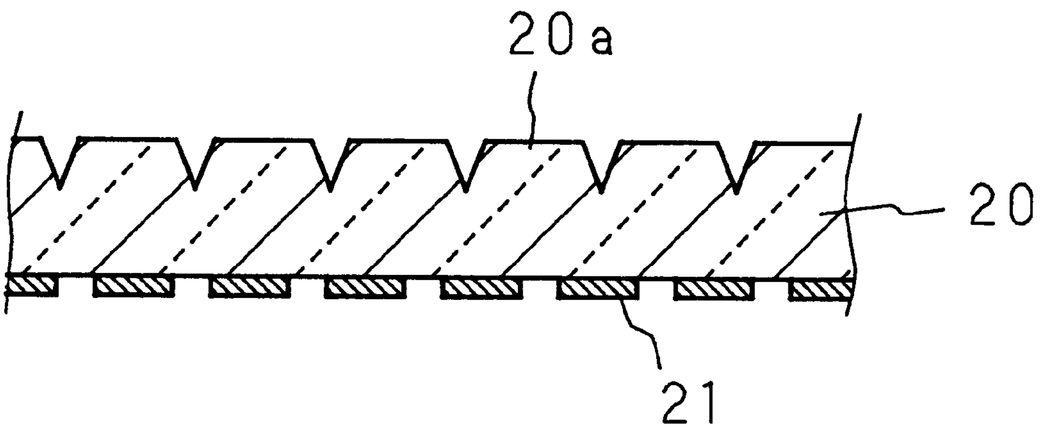
FIG. 15 is a sectional view of the decorative sheet of FIG. 14.
Figure 16:
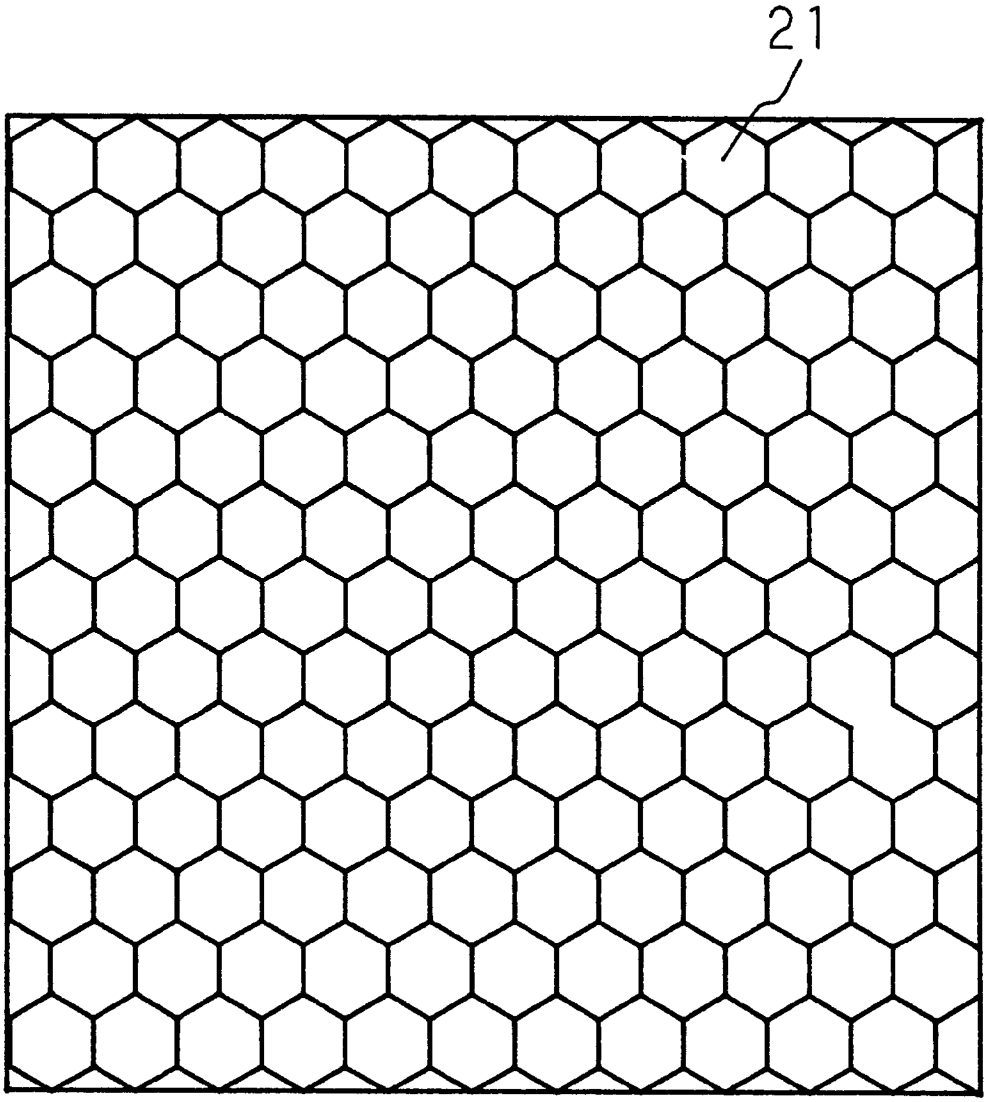
FIG. 16 is an enlarged view of a hexagonal pattern used in the seventh embodiment.

Embodiment 7:

FIG. 14 is an enlarged perspective view for showing the structure of a decorative sheet of a seventh embodiment of the invention, and FIG. 15 is a vertical sectional view thereof. In FIGS. 14 and 15, a reference numeral 20 denotes a translucent sheet material with a given thickness, and hexagonal convexities 20*a* are formed on the front surface of the sheet material 20 as a first designed portion. The hexagonal convexity 20*a* is formed as hexagonal projections each having an equilateral hexagonal shape in a plan view and a trapezoidal section, and such hexagonal convexities 20*a* are aligned in plural rows and columns with a constant pitch as is shown in FIG. 14. The hexagonal convexities 20*a* are produced through roller pressing. On the back surface of the sheet material 20, a hexagonal pattern 21, which is formed by reducing the hexagonal pattern obtained as a plan view of the hexagonal convexity 20*a* at a ratio of 98%, is printed as a second designed portion. FIG. 16 is an enlarged view of the hexagonal pattern 21. Specifically, the sheet material 20 has a thickness of 0.3 mm, and each hexagonal projection of the hexagonal convexity 20*a* has a line width corresponding to a width of 75 lines aligned per inch.

Figure 17:
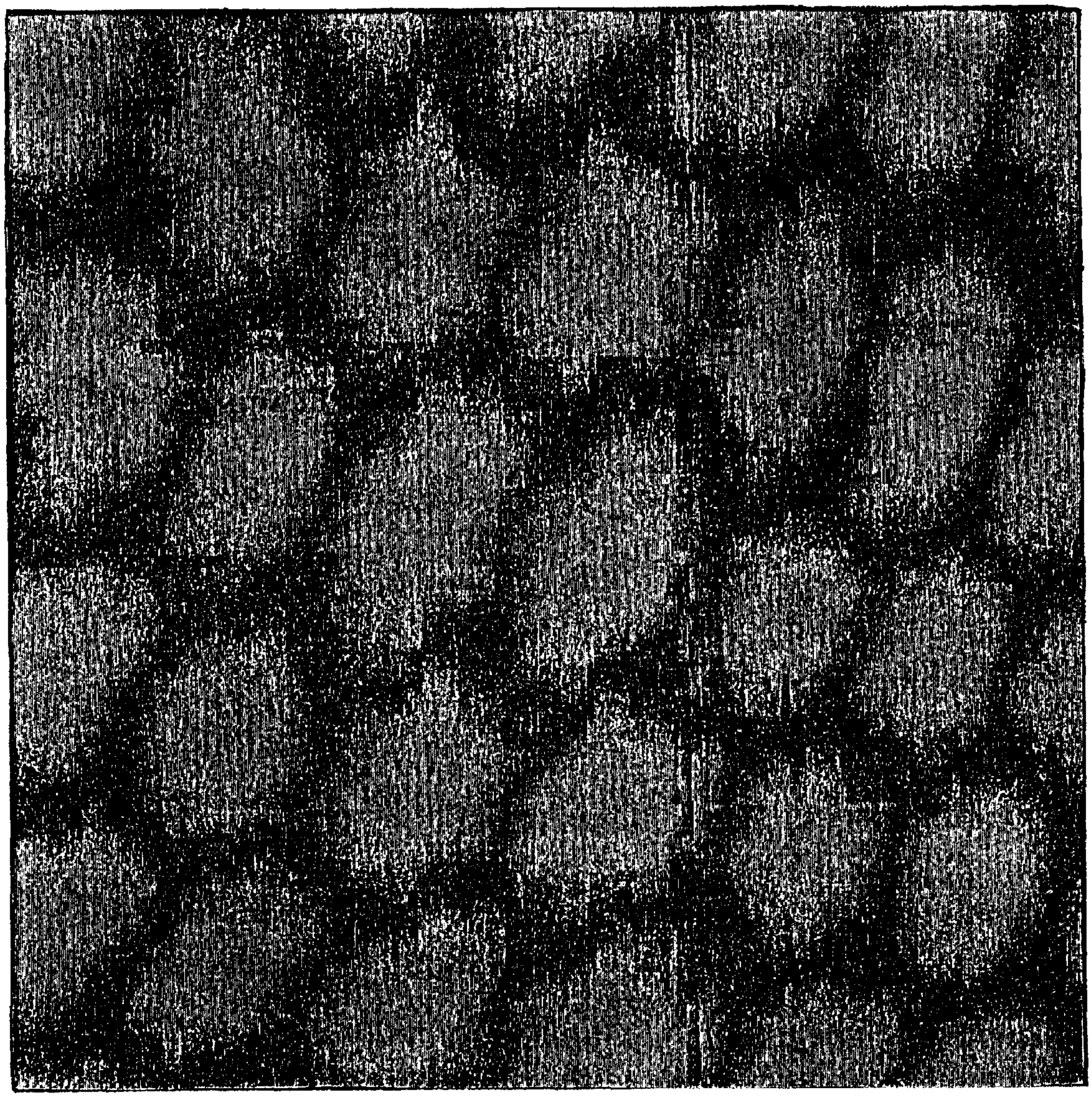
FIG. 17 is a diagram for showing a moire pattern formed in the seventh embodiment.

When this decorative sheet is seen from the front or back surface, a hexagonal moire pattern (with inside of each hexagon having a light color as compared with outside thereof) is obtained due to the moire phenomenon. FIG. 17 is an enlarged view of the moire pattern. The moire pattern is enlarged as compared with the hexagonal pattern 21 formed on the back surface and has a dimension of 5 mm through 1.5 cm. This moire pattern looks to have a depth and to be formed beyond the surface of the sheet material 20, and the decorative sheet thus can attain the three-dimensional effect.

Figure 18:
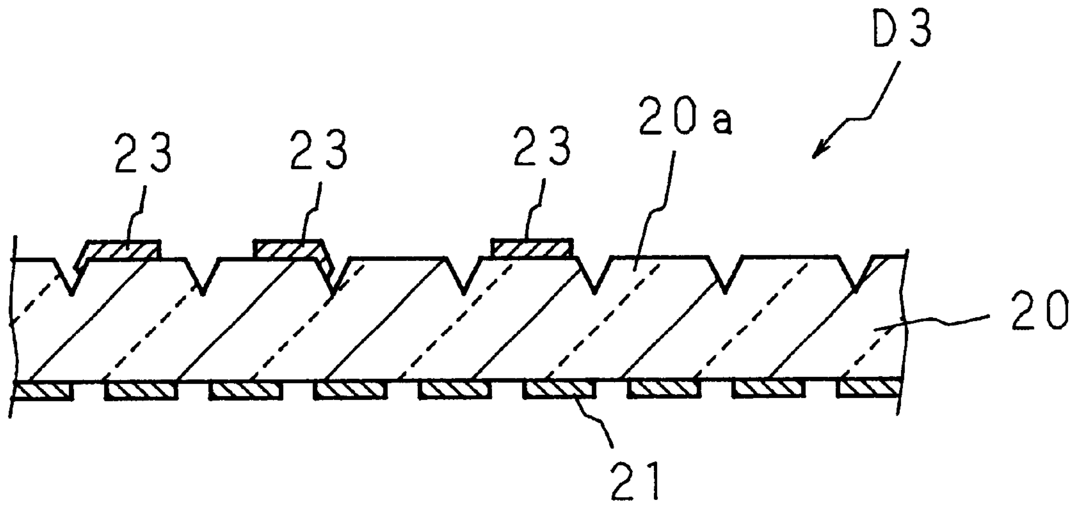
FIG. 18 is a sectional view for showing the structure of another decorative sheet D3 of the seventh embodiment.

A predetermined multicolored picture is printed on the front surface of this decorative sheet. FIG. 18 is a sectional view for showing the structure of the thus obtained decorative sheet D3. As is shown in FIG. 18, when a picture 23 is printed on the hexagonal convexities 20*a*, the moire pattern looks to be formed further beyond the picture. When this decorative sheet D3 is used as a shower curtain, the decorativeness is further improved due to the gathers and swing of the curtain, resulting in obtaining a gorgeous curtain.

Embodiment 8:

The decorative sheet of the seventh embodiment is produced by directly forming the hexagonal convexities 20*a* and the hexagonal patterns 21 on the front and back surfaces of the sheet material 20, respectively. Alternatively, a decorative sheet can be produced by adhering other translucent sheet materials, on which the hexagonal convexities 20*a* and the hexagonal patterns 21 are respectively formed, onto the front and back surfaces of another translucent sheet.

Figure 19:
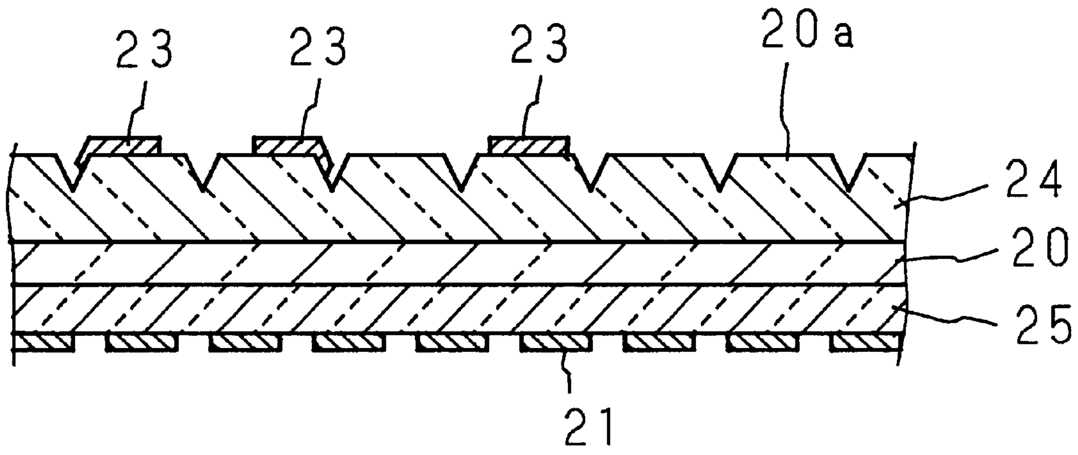
FIG. 19 is a sectional view for showing the structure of a decorative sheet according to an eighth embodiment of the invention.

FIG. 19 is a sectional view for showing the structure of such a decorative sheet. A front sheet material 24 on which a hexagonal convexities 20*a* is formed is adhered onto the front surface of a sheet material 20, and a back sheet material 25 on which a hexagonal patterns 21 is printed is adhered onto the back surface of the sheet material 20. A picture 23 is printed on the front sheet material 24. This decorative sheet can provide a three-dimensional pattern similarly to that of the seventh embodiment.

Figure 20:
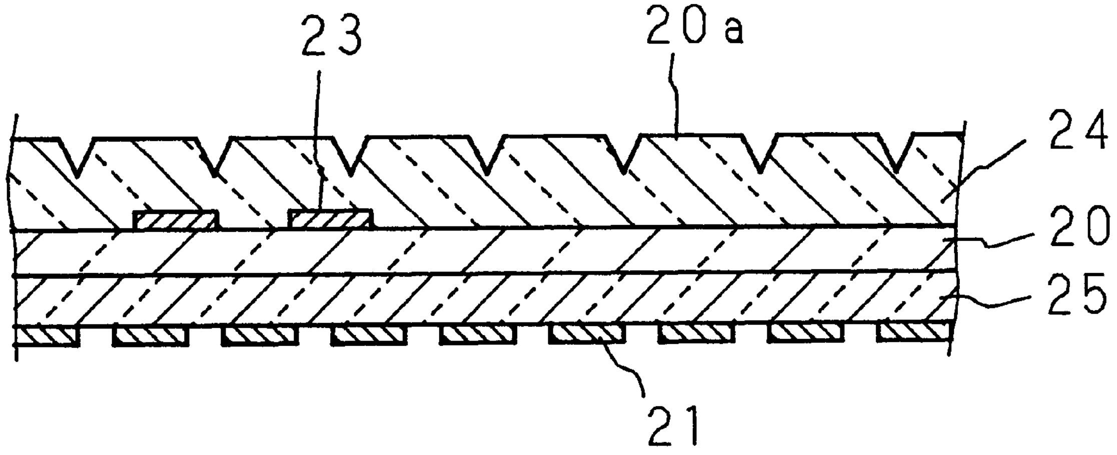
FIG. 20 is a sectional view for showing the structure of another decorative sheet of the eighth embodiment.

Alternatively, the picture 23 can be printed on the front surface of the translucent sheet material 20. FIG. 20 is a sectional view for showing the structure of such a decorative sheet. The picture 23 is printed on the front surface of the sheet material 20 with a given thickness, the front sheet material 24 on which the hexagonal convexities 20*a* are formed is adhered onto the surface of the picture 23, and the back sheet material 25 on which the hexagonal patterns 21 is printed is adhered onto the back surface of the sheet material 20. This decorative sheet can also provide a three-dimensional pattern similarly to that of the seventh embodiment.

In each of the above-described seventh and eighth embodiments, the hexagonal pattern 21 on the back surface of the sheet material 20 is formed by reducing the hexagonal pattern obtained as a plan view of the hexagonal convexity 20*a* at a ratio of 98%. Alternatively, the hexagonal pattern on the back surface can be formed by enlarging the hexagonal pattern on the front surface at a ratio of 101%. Also in this case, a three-dimensional pattern can be provided. In this case, the pattern looks to be formed above the surface of the sheet material 20.

Figure 21:
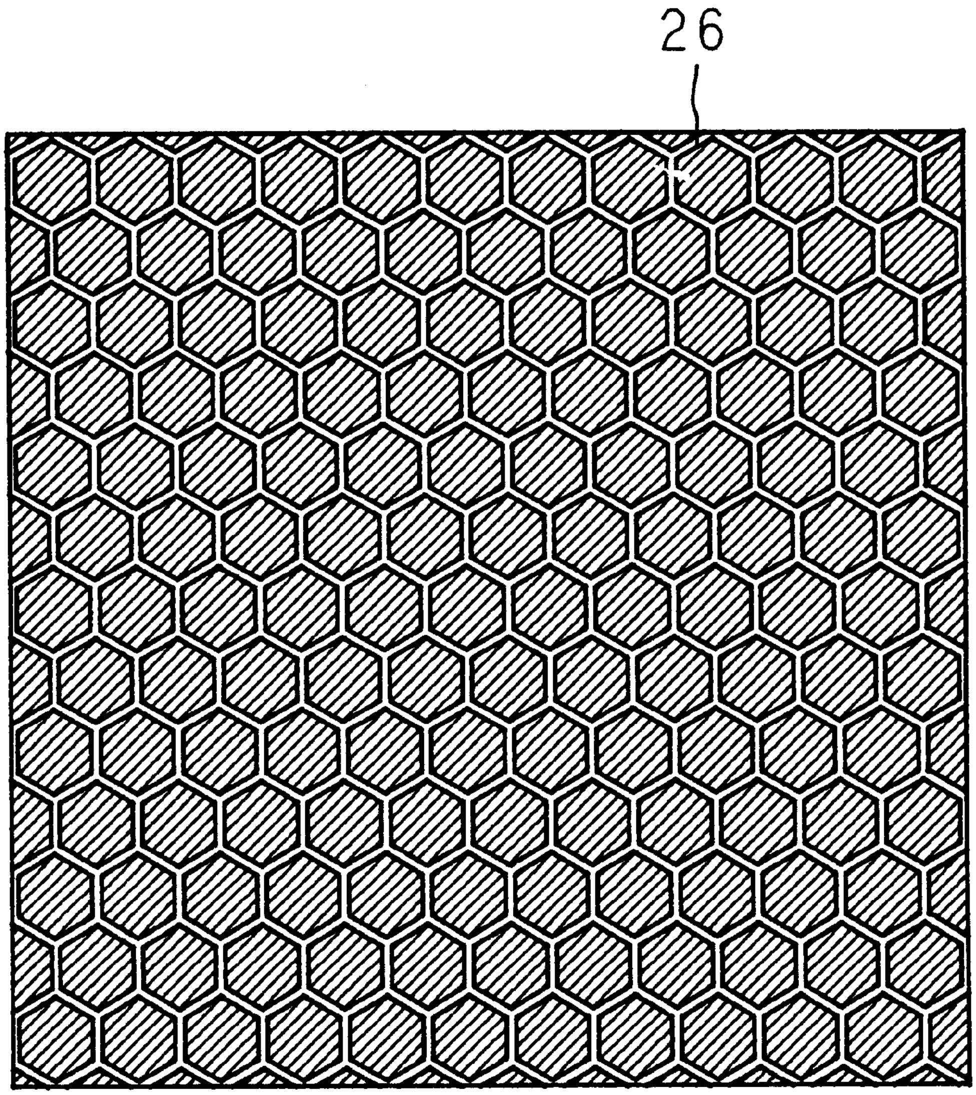
FIG. 21 is a plane view of a hexagonal pattern used in a ninth embodiment of the invention.

Embodiment 9:

In the decorative sheet of the seventh embodiment, the hexagonal pattern 21 printed on the back surface is formed as a positive pattern with inside of each hexagon having a dark color as compared with outside of the hexagon. In a ninth embodiment, a negative pattern with each hexagon having a deep color will be used. In a decorative sheet of the ninth embodiment, a hexagonal pattern 26 formed by reducing the hexagonal pattern obtained as a plan view of a hexagonal convexity 20*a* at a ratio of 98% is formed by printing as a second designed portion. FIG. 21 is a plane view of the hexagonal pattern 26. Apart from this hexagonal pattern 26, the decorative sheet of the ninth embodiment is the same as that of the seventh embodiment, and the description is omitted.

Figure 22:
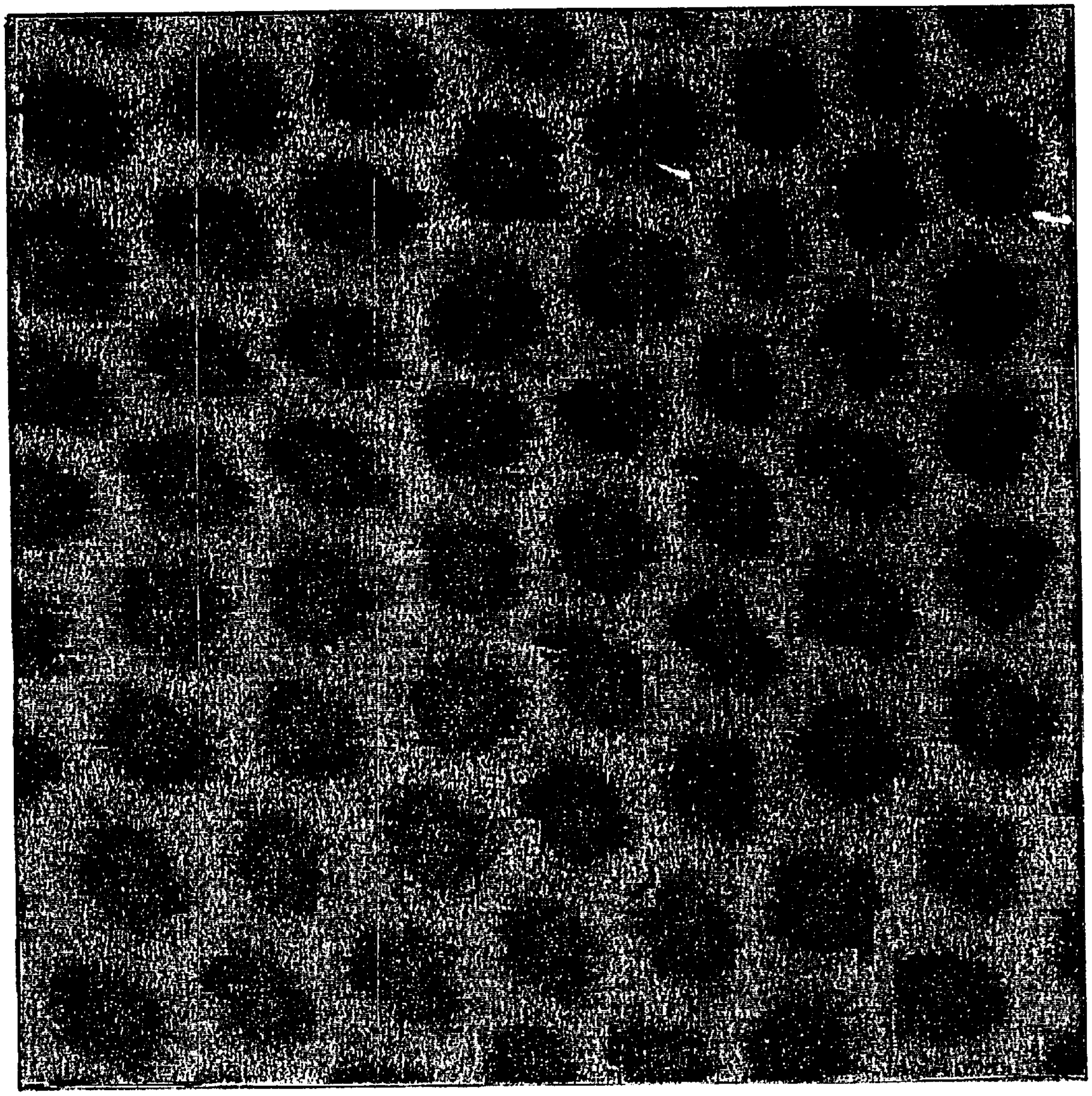
FIG. 22 is a diagram for showing a moire pattern formed in the ninth embodiment.

When this decorative sheet is seen from the front or back surface, a hexagonal moire pattern (with inside of each hexagon having a dark color as compared with outside thereof) is obtained due to the moire phenomenon. FIG. 22 is an enlarged view of this moire pattern. This moire pattern is enlarged as compared with the hexagonal pattern 26 formed on the back surface, and has a dimension of 5 mm through 1.5 cm. This moire pattern looks to have a depth and to be formed beyond the surface of the sheet material 20, and the decorative sheet can attain the three-dimensional effect.

Embodiment 10:

The decorative sheet of the ninth embodiment is produced by forming the hexagonal convexity 20*a* and the hexagonal pattern 26 on the front and back surfaces of the sheet material 20, respectively. Alternatively, a decorative sheet can be produced by adhering other translucent sheet materials, on which the hexagonal convexity 20*a* and the hexagonal pattern 26 are respectively formed, onto the front and back surfaces of the sheet material 20 as is shown in FIG. 19. Such a decorative sheet can attain the same effect. Also, in this case, when a picture 23 is printed on any surface between the translucent sheet materials on which the hexagonal convexity 20*a* and the hexagonal pattern 26 are respectively formed as is shown in FIG. 20, the same effect can be attained.

Figure 23:
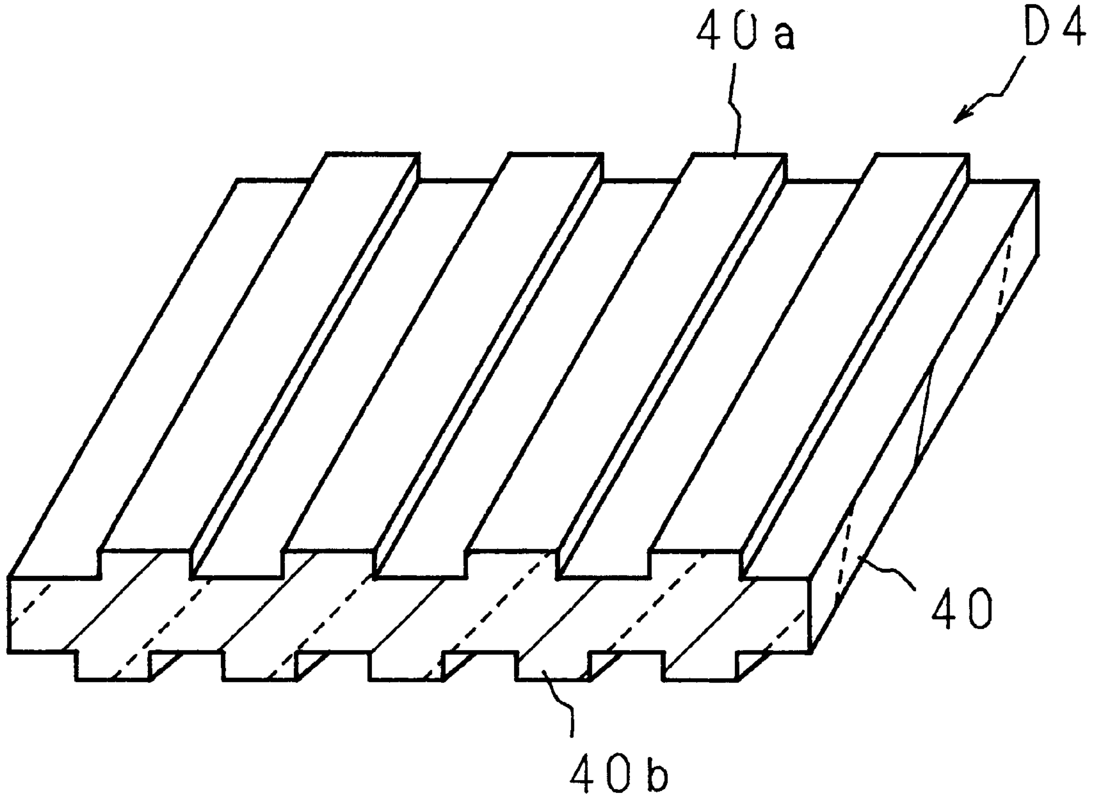
FIG. 23 is an enlarged perspective view for showing the structure of a decorative sheet according to an eleventh embodiment of the invention.

Embodiment 11:

FIG. 23 is an enlarged perspective view for showing the structure of a decorative sheet according to an eleventh embodiment of the invention. In FIG. 23, a reference numeral 40 denotes a translucent sheet material with a given thickness, and a first stripe convexity 40*a* is formed on the front surface of the sheet material 40 as a first designed portion. The stripe convexity 40*a* is formed as striped projections in a plan view each having a rectangular section, and such strip convexities 40*a* are aligned with a constant pitch. The stripe convexities 40*a* are formed through the roller pressing. On the back surface of the sheet material 40, a second stripe convexities 40*b* obtained by reducing the stripe pattern of the first stripe convexity 40*a* at a ratio of 98% is formed through the roller pressing as a second designed portion. The first stripe convexity 40*a* is formed to cross the second stripe convexity 40*b* at a given angle. Specifically, the sheet material 40 is a semitranslucent sheet with a color of light pink having a thickness of 0.3 mm, and the first stripe convexity 40*a* has a pitch of 0.6 mm, and the crossing angle between the first and second stripe convexity 40*a* and 40*b* is 1.5 degrees.

When this decorative sheet is seen from the front or back surface, a stripe moire pattern is obtained due to the moire phenomenon. This moire pattern has a depth and looks as if it had a drape, and the decorative sheet can attain the three-dimensional effect. In addition, since the stripe convexities on the front and back surfaces are formed so as to cross each other, a valley portion between the projections can be prevented from being torn. Furthermore, when a translucent sheet on which a multicolored predetermined picture is printed is placed over the front or back surface of this decorative sheet, the resultant decorative sheet can attain further improved decorativeness suitable to a gorgeous curtain.

Embodiment 12:

In the decorative sheet of the eleventh embodiment, the stripe convexities 40*a* and 40*b* are directly formed on the front and back surfaces of the sheet material 40, respectively. Alternatively, a decorative sheet can be produced by adhering translucent sheet materials, on which the stripe convexities 40*a* and 40*b* are respectively formed, onto the front and back surfaces of another translucent sheet material.

Figure 24:
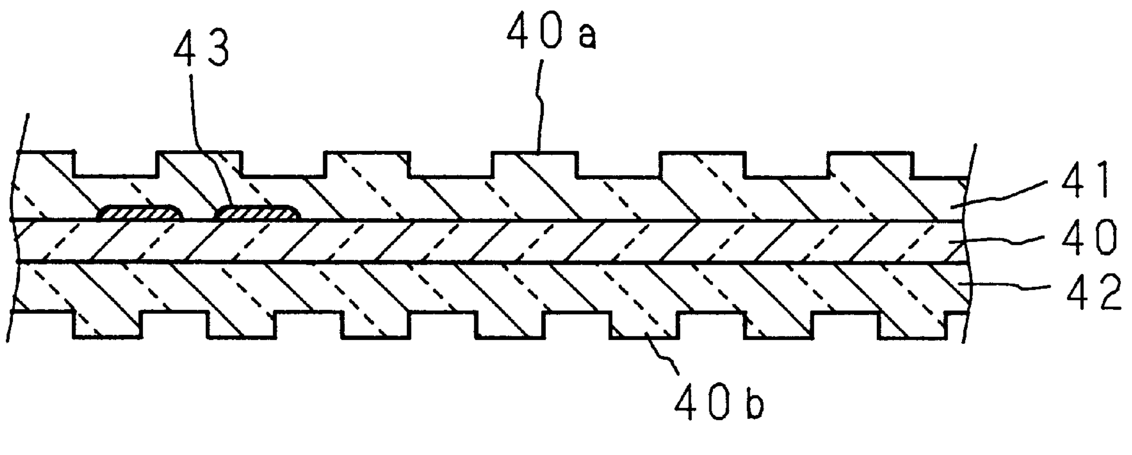
FIG. 24 is a sectional view for showing the structure of a decorative sheet according to a twelfth embodiment of the invention.

FIG. 24 is a sectional view for showing the structure of such a decorative sheet. A front sheet material 41 on which a stripe convexities 40*a* are formed is adhered onto the front surface of a sheet material 40, and a back sheet material 42 on which a stripe convexities 40*b* are formed is adhered onto the back surface of the sheet material 40. On the surface of the sheet material 40, a picture 43 is printed. This decorative sheet can attain the improved decorativeness similarly to that of the eleventh embodiment.

In each of the above-described eleventh and twelfth embodiments, the first stripe convexity 40*a* and the second stripe convexity 40*b* obtained by reducing the first stripe convexity 40*a* are respectively formed on the front and back surfaces of the translucent sheet, which does not limit the invention. For example, when an convex pattern on the back surface is formed in the shape of the moire fringes 12 (shown in FIG. 5) described in the first embodiment, a rhombic moire pattern with the three-dimensional effect can be obtained, and the resultant decorative sheet can attain a higher three-dimensional effect.

Figure 25:
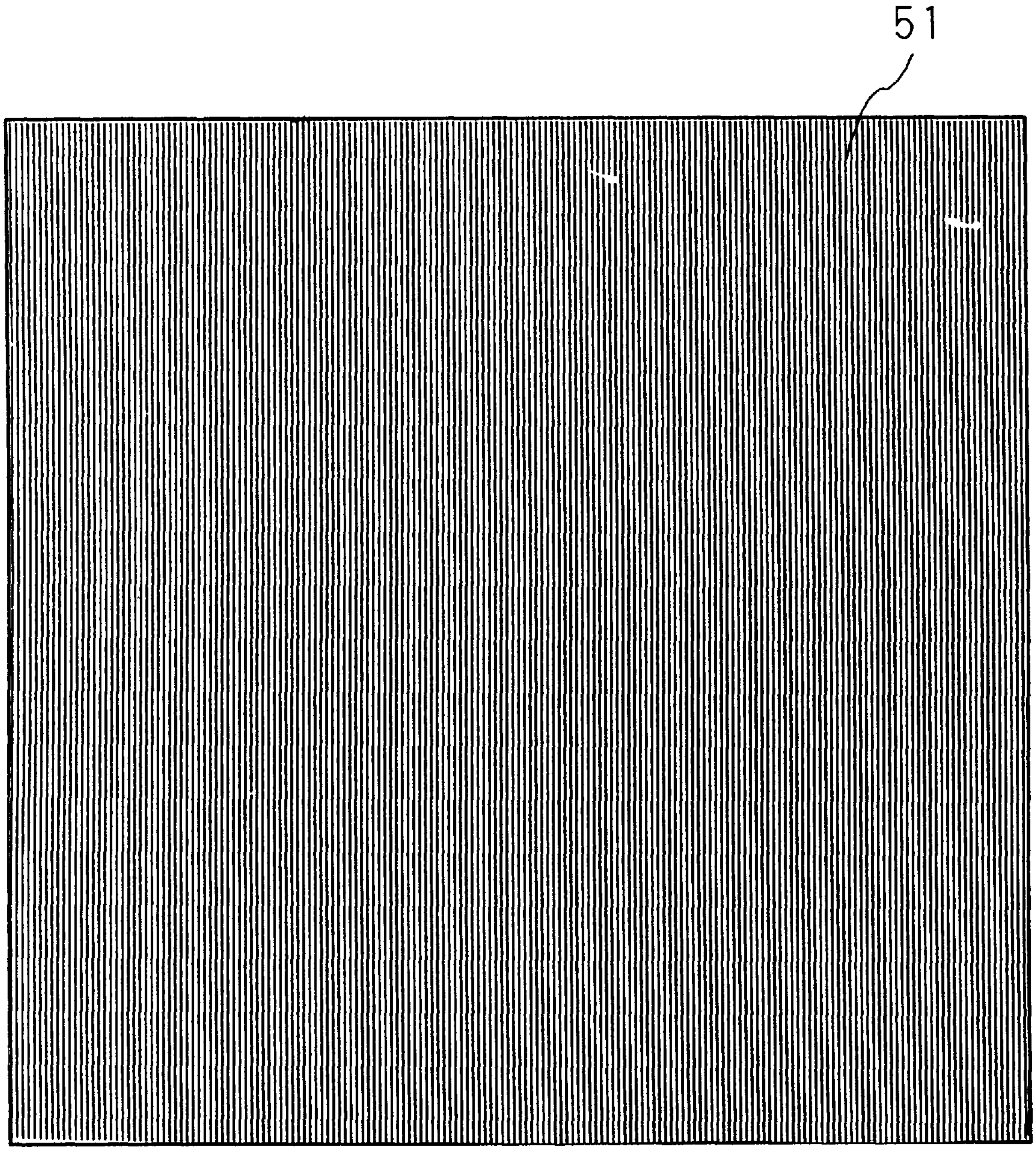
FIG. 25 is an enlarged view of stripes used in a thirteenth embodiment of the invention.
Figure 26:
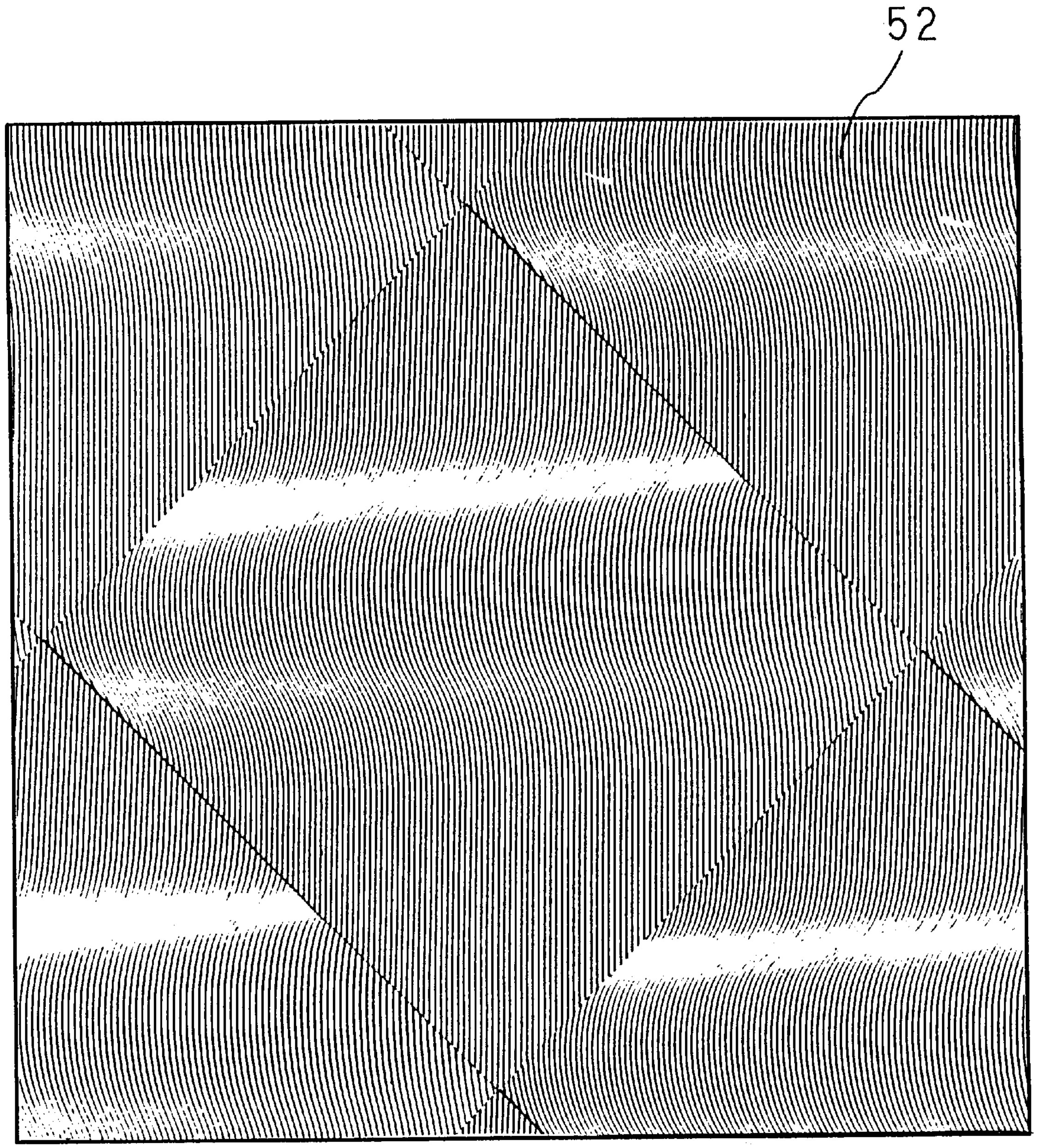
FIG. 26 is an enlarged view of moire curves used in the thirteenth embodiment.
Figure 27:
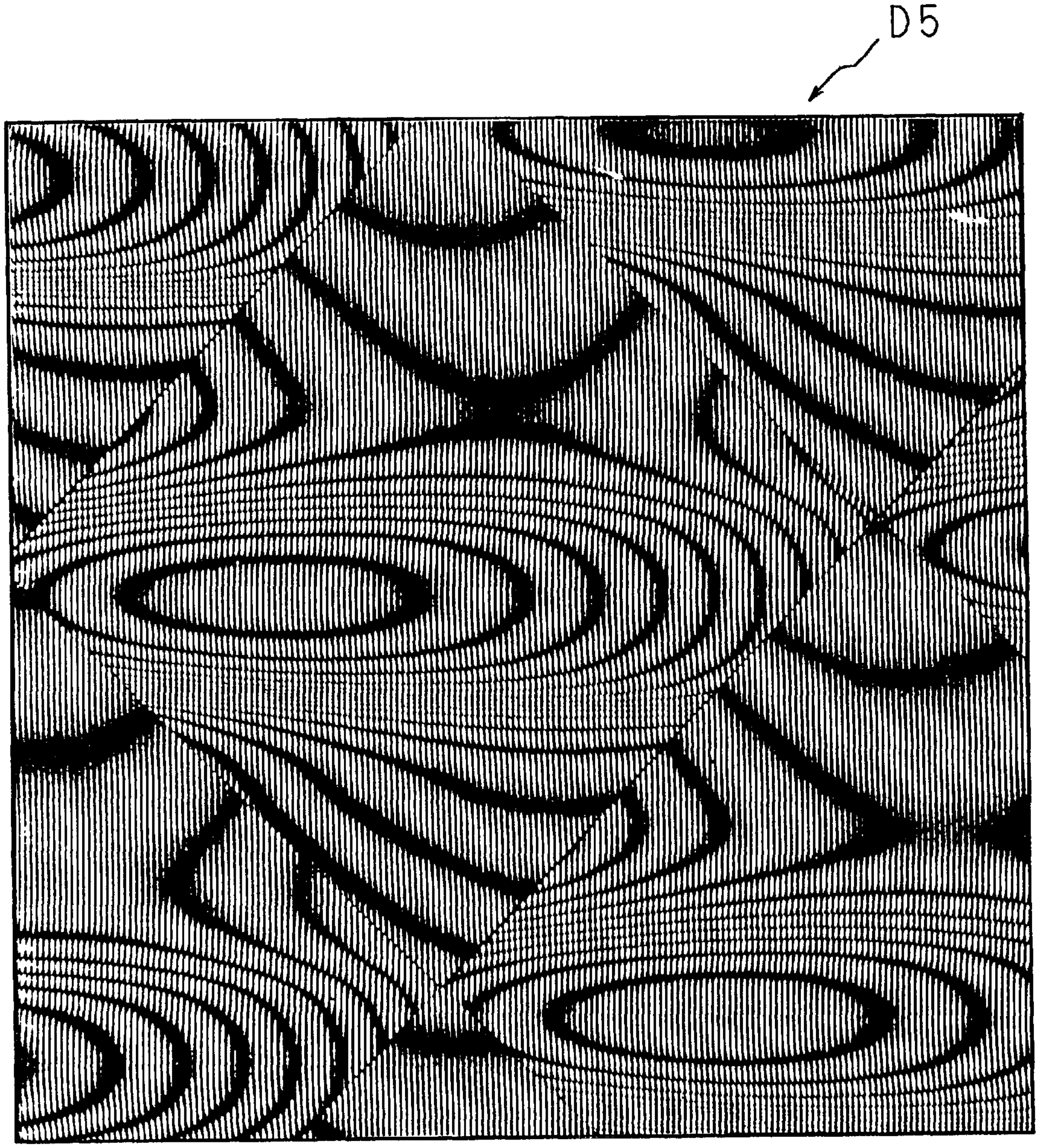
FIG. 27 is a diagram for showing a moire pattern formed in the thirteenth embodiment.

Embodiment 13:

In each of the above-described first through twelfth embodiments, patterns in similar shapes are formed on the front and back surfaces of a translucent sheet material, but when different patterns are formed on the respective surfaces, the three-dimensional effect can be attained similarly. A decorative sheet of this embodiment is produced by printing predetermined patterns on the front and back surfaces of a translucent sheet material 10 as is shown in FIG. 3. On the front surface of the sheet material 10, stripes 51 including a large number of parallel straight lines with a constant pitch are printed as a first designed portion. FIG. 25 is an enlarged view of the stripes 51. On the back surface, moire curves 52 in which a curved moire pattern is repeatedly formed with a constant pitch are printed as a second designed portion. FIG. 26 is an enlarged view of the moire curves 52. When the thus obtained decorative sheet D5 is seen from the front or back surface, a ripply moire pattern is obtained due to the moire phenomenon. FIG. 27 is an enlarged view of this moire pattern. This moire pattern looks to have a depth, and the decorative sheet can attain the three-dimensional effect.

Embodiment 14:

The decorative sheet of the thirteenth embodiment is produced by printing the stripes 51 and the moire curves 52 on the front and back surfaces of the sheet material, respectively. Alternatively, a decorative sheet having the same effect can be produced by adhering translucent sheet materials, on which the respective patterns are printed, onto the front and back surfaces of another sheet material as is shown in FIG. 9. In this case, when a picture is printed on any surface between the translucent sheet materials bearing the respective patterns, the same effect can be attained.

Embodiment 15:

In the decorative sheet of the eleventh embodiment, the similar convexities are respectively formed on the front and back surfaces of the translucent sheet material 40. Alternatively, a decorative sheet having the same three-dimensional effect can be produced by forming convexities in different patterns on the front and back surfaces, respectively. On the front surface of a translucent sheet material, stripe convexities 40*a* are formed through the roller pressing as is shown in FIG. 23, and on the back surface thereof, geometric convexities are formed in a geometric pattern 31 in a plan view including a combination of plural rhombi in various sizes as is shown in FIG. 11. When the thus produced decorative sheet is seen from the front or back surface, a striped moire pattern is obtained due to the moire phenomenon. This moire pattern looks to have a depth, and the decorative sheet can attain the three-dimensional effect.

Embodiment 16:

The decorative sheet of the fifteenth embodiment is produced by directly forming the stripe convexities and the geometric convexities on the front and back surfaces of the sheet material, respectively. Alternatively, a decorative sheet having the same effect can be produced by adhering translucent sheet materials, on which the respective convexities are formed, onto the front and back surfaces of a sheet material as is shown in FIG. 24. Also in this case, when a picture is printed on any surface between the translucent sheet materials bearing the respective convexities, the same effect can be attained.

Figure 28:
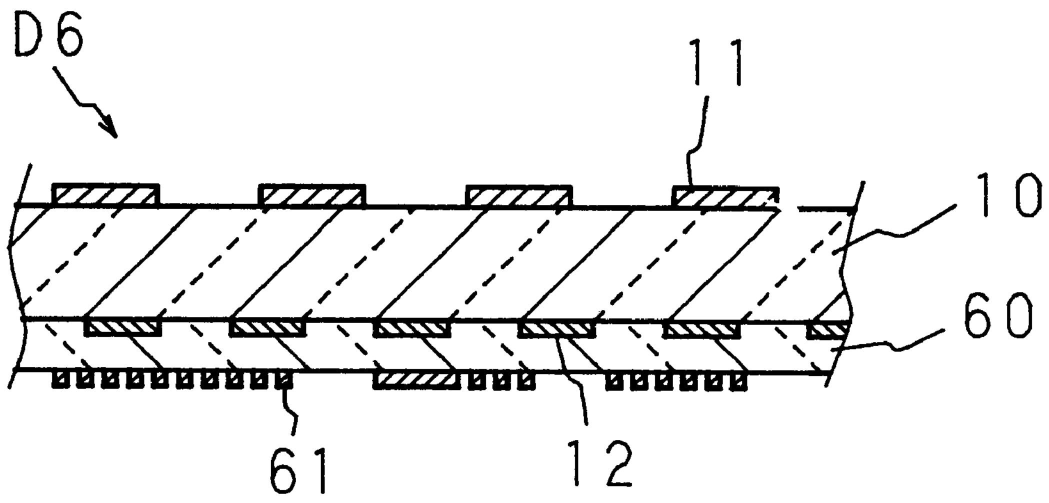
FIG. 28 is a sectional view for showing the structure of a decorative sheet D6 according to a seventeenth embodiment of the invention.
Figure 29:
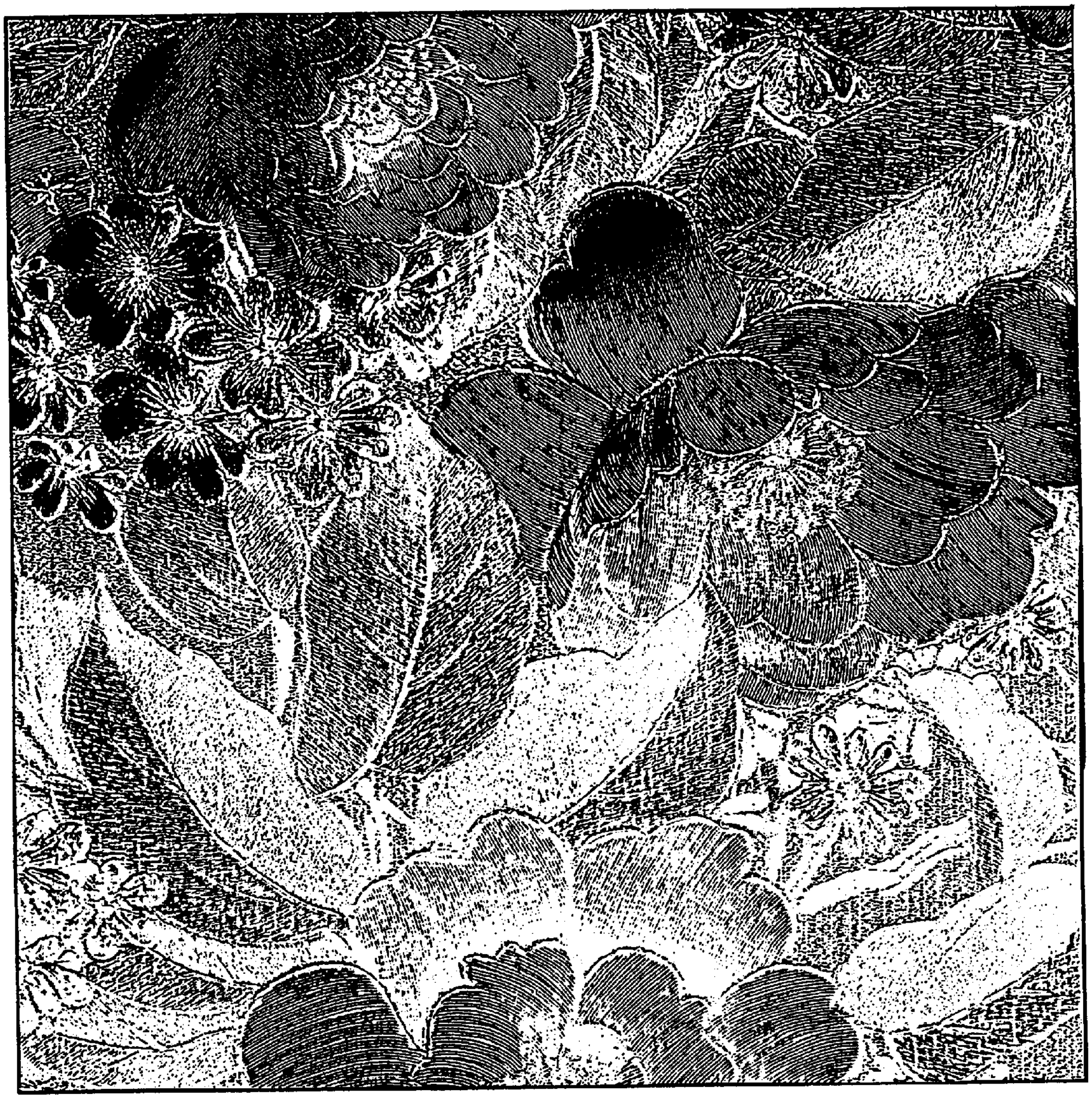
FIG. 29 is a diagram for showing a line drawing used in the seventeenth embodiment.

Embodiment 17:

FIG. 28 is a sectional view for showing the structure of a decorative sheet D6 according to a seventeenth embodiment of the invention. This decorative sheet is produced by adhering a translucent sheet 60, on which a line drawing 61 is printed as a third designed portion, onto the back surface of the decorative sheet of the first embodiment. Specifically, on the front surface of a sheet material 10, stripes 11 as is shown in FIG. 4 are printed in a transparent ink, and on the back surface, moire fringes 12 as is shown in FIG. 5 are printed in a milk white ink. On the translucent sheet 60 adhered onto the back surface, the line drawing 61 drawn so that translucent portions can remain inside of a flower pattern with a small pitch is printed in a black ink. FIG. 29 is a diagram for showing the line drawing 61 printed on the translucent sheet 60.

On the decorative sheet D6 having the above-described structure, a latticed moire pattern having the three-dimensional effect similarly to that of the first embodiment is formed, in which the flower pattern looks to be formed above the surface. When a space on the back surface is bright, the moire pattern having the three-dimensional effect is weakened by light translucent of the sheet, so that the flower pattern can be seen. When the space on the back surface is dark, the flower pattern is hidden by light reflected by the sheet, so that the moire pattern having the three-dimensional effect can be seen. In the case where this decorative sheet D6 is used as a window decoration sheet, when the sheet is adhered onto a window pane with the line drawing 61 facing the outdoors, the milk white latticed pattern can be seen from the indoors at night as if it was formed in the depth, so that the window pane looks to have a large depth. In contrast, the flower pattern can be seen during the daytime. Thus, the decorative sheet D6 can provide a window decoration with high decorativeness.

Figure 30:
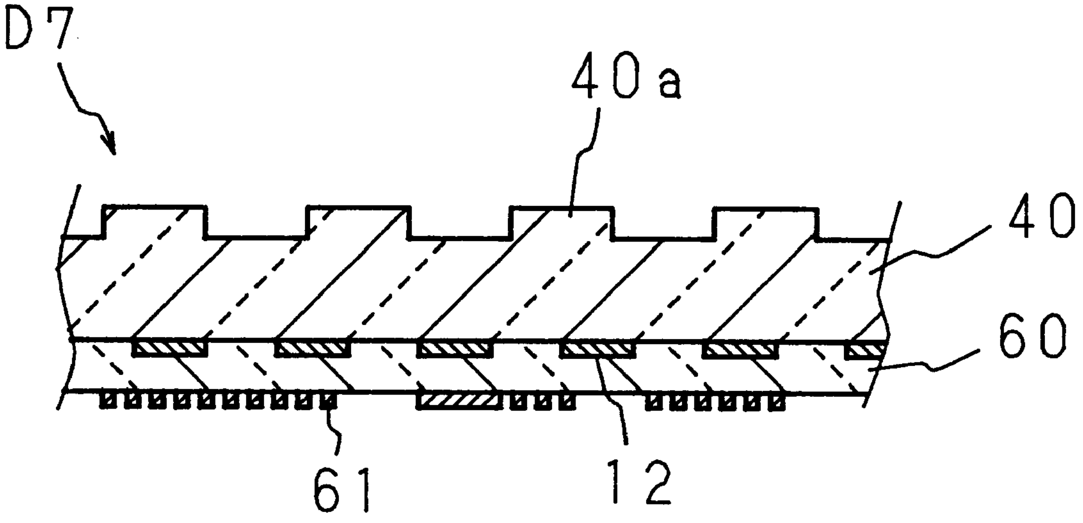
FIG. 30 is a sectional view for showing the structure of a decorative sheet D7 according to an eighteenth embodiment of the invention.

Embodiment 18:

In the decorative sheet of the seventeenth embodiment, the stripes are formed on the front and back surfaces of the translucent sheet material 10 by printing in order to form the pattern having the three-dimensional effect. When the front surface is provided with convexity and the back surface is provided with printing as is described in the seventh embodiment, the same effect can be attained. FIG. 30 is a sectional view for showing the structure of such a decorative sheet D7. On the front surface of a sheet material 40, a stripe convexity 40*a* as is shown in FIG. 23 is formed through the roller pressing, and on the back surface, moire fringes 12 as is shown in FIG. 5 are printed in a milk white ink. On a translucent sheet 60 adhered onto the back surface, a line drawing 61, as is shown in FIG. 29, drawn so that translucent portions can remain inside of a flower pattern with a small pitch is printed in a black ink. This decorative sheet D7 can attain the same effect as that of the seventeenth embodiment, and can provide a window decoration with high decorativeness when used as a window decoration sheet.

In each of the seventeenth and eighteenth embodiments, the first and second designed portions are printed in the transparent ink and the milk white ink, respectively, which does not limit the invention. The inks can be in any colors as far as a large quantity of light is reflected when the front surface of the decorative sheet is irradiated and the patterns formed in the first and second designed portions can be easily hidden when the back surface of the sheet is irradiated. Also, in each of the seventeenth and eighteenth embodiments, the third designed portion is printed in the black ink, which does not limit the invention. The third pattern can be printed in any color as far as the pattern in the third designed portion can be easily hidden when the back surface of the decorative sheet is not irradiated and the pattern in the third designed portion can be easily seen when the back surface of the decorative sheet is irradiated.

Furthermore, in each of the seventeenth and eighteenth embodiments, the line drawing 61 is adhered onto the back surface of the sheet material, which does not limit the invention. When the line drawing 61 is adhered onto the front surface, the same effect can be attained. In the case where this decorative sheet is used as a window decoration sheet, when the sheet is adhered onto a window pane with the line drawing 61 facing the outdoors, the milk white latticed pattern can be seen from the indoors at night as if it was formed in the depth, so that the window pane can look to have a depth. In contrast, the flower pattern can be seen during the daytime. Thus, the decorative sheet can provide a window decoration with high decorativeness.

Furthermore, when the line drawing 61 is adhered onto the back surface of the decorative sheet of the tenth, thirteenth or fifteenth embodiment, in which the moire pattern having the three-dimensional effect is formed, the same effect as in the seventeenth and eighteenth embodiments can be attained.

In each of the above-described first through eighteenth embodiments, the translucent sheet material can be semi-translucent and colored, as far as it can transmit light. Furthermore, as the translucent sheet material, any of general synthetic resin sheets of polyethylene, polypropylene, polyester, nylon, polyurethane, polyvinyl chloride, polyvinyl acetate or polyacrylic can be used.

Also, a method of printing the patterns is not specifically defined as far as the patterns can be desirably positioned, and the method can be, for example, the gravure or the offset. Furthermore, the patterns can be of a single color or multicolored. In addition, among the above-described embodiments, when the pattern is printed on merely one surface, the surface can be front or back.

Furthermore, a ratio of reduction or enlargement for forming the pattern having the three-dimensional effect depends upon the thickness of the translucent sheet. In view of the thickness of a generally used decorative sheet, the ratio of reduction is preferably 90% or more and less than 100%, and the ratio of enlargement is preferably more than 100% and 110% or less. In the case of reduction, the pattern looks as if it was formed beyond the surface, and in the case of enlargement, the pattern looks as if it was formed above the surface. Moreover, the size and shape of the three-dimensional pattern depend upon the angle at which the front pattern is placed over the back pattern. The tone of the three-dimensional pattern depends upon the line widths and pitches of the front and back patterns. When the pattern is multicolored, the three-dimensional effect is further enhanced. Moreover, a pitch of the front and back patterns is preferably 0.1 mm to 0.8 mm for effectively attaining the three-dimensional effect.

In each of the first, third, fifth, thirteenth and seventeenth embodiments, the patterns are printed on the both surfaces of the sheet material. Therefore, when the patterns are simultaneously printed, the number of manufacturing processes can be reduced.

In addition, in each of the seventh through twelfth, fifteenth, sixteenth and eighteenth embodiments, the decorative sheet can be produced in a comparative large size by adopting the roller pressing.

In this manner, according to the present invention, patterns are formed on the front and back surfaces of a translucent sheet, thereby forming the three-dimensional pattern on the sheet. Thus, very high decorativeness can be attained. Also, since the patterns can be formed on the front and back surfaces of the translucent sheet by printing, very high accuracy is not required for the production, and the decorative sheet can be easily produced. Moreover, since the patterns on the front and back surfaces are formed by printing, no slit line is formed and the decorative sheet is difficult to tear. Furthermore, when the pattern is formed with irregularities through the roller pressing, the decorative sheet can be produced in a comparatively large size. In addition, since a flexible sheet can be used as the material, the decorative sheet is good in processability.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A decorative sheet having a three-dimensional effect, comprising:

a translucent sheet material;

a first designed portion formed directly on one surface of the translucent sheet material and having a first pattern repeatedly formed with a predetermined pitch; and a second designed portion formed directly on the other surface of the translucent sheet material and having a second pattern similar to the first pattern.

2. The decorative sheet according to claim 1, wherein the first pattern and the second pattern are formed by printing.

3. A decorative sheet having a three-dimensional effect, comprising:

a translucent sheet material;

a first designed portion formed on one surface of the translucent sheet material and having a first pattern repeatedly formed with a predetermined pitch; and a second designed portion formed on the other surface of the translucent sheet material and having a second pattern similar to the first pattern;

wherein the first pattern is formed with irregularities each having a rectangular section, and the second pattern is formed by printing.

4. A decorative sheet having a three-dimensional effect, comprising:

a translucent sheet material;

a first designed portion formed on one surface of the translucent sheet material and having a first pattern repeatedly formed with a predetermined pitch; and a second designed portion formed on the other surface of the translucent sheet material and having a second pattern similar to the first pattern;

wherein the first pattern and the second pattern are formed with irregularities each having a rectangular section.

5. A decorative sheet having a three-dimensional effect, comprising:

a translucent sheet material;

a first designed portion formed on one surface of the translucent sheet material and having a first pattern repeatedly formed with a predetermined pitch; and a second designed portion formed on the other surface of the translucent sheet material and having a second pattern similar to the first pattern;

wherein the second pattern is smaller than the first pattern.

6. A decorative sheet having a three-dimensional effect, comprising:

a translucent sheet material;

a first designed portion formed on one surface of the translucent sheet material and having a first pattern repeatedly formed with a predetermined pitch; and a second designed portion formed on the other surface of the translucent sheet material and having a second pattern similar to the first pattern;

the decorative sheet according to claim 1, wherein the second pattern is larger than the first pattern.

7. The decorative sheet according to claim 1, wherein the first designed portion is obtained by forming the first pattern on one surface of a second translucent sheet, and the second designed portion is obtained by forming the second pattern on one surface of a third translucent sheet.

8. A decorative sheet having a three-dimensional effect, comprising:

a translucent sheet material;

a first designed portion formed on one surface of the translucent sheet material and having a first pattern repeatedly formed with a predetermined pitch; and a second designed portion formed on the other surface of the translucent sheet material and having a second pattern similar to the first pattern;

wherein a predetermined picture is formed on a front and back surface of the first designed portion, the second designed portion or the translucent sheet material.

9. The decorative sheet according to claim 2, wherein the second pattern is formed by printing a moire pattern by using the first pattern.

10. The decorative sheet according to claim 2, wherein the first designed portion is produced by printing the first pattern on one surface of the translucent sheet material, and the second designed portion is produced by printing the second pattern on the other surface of the translucent sheet material.

11. The decorative sheet according to claim 3, wherein the first designed portion is produced by forming irregularities, each having a rectangular section, in the shape of the first pattern in a plan view on one surface of the translucent sheet material, and the second designed portion is produced by printing the second pattern on the other surface of the translucent sheet material.

12. The decorative sheet according to claim 4, wherein the first designed portion is produced by forming irregularities, each having a rectangular section, in the shape of the first pattern in a plan view on one surface of the translucent sheet material, and the second designed portion is produced by forming irregularities, each having a rectangular section, in the shape of the second pattern in a plan view on the other surface of the translucent sheet material.

13. A decorative sheet having a three-dimensional effect, comprising:

a translucent sheet material;

a first designed portion formed directly on one surface of the translucent sheet material and having a first pattern repeatedly formed with a predetermined pitch; and a second designed portion formed directly on the other surface of the translucent sheet material and having a second pattern repeatedly formed with a predetermined pitch.

14. The decorative sheet according to claim 13, wherein the first pattern and the second pattern are formed by printing.

15. A decorative sheet having a three-dimensional effect, comprising:

a translucent sheet material;

a first designed portion formed on one surface of the translucent sheet material and having a first pattern repeatedly formed with a predetermined pitch; and a second designed portion formed on the other surface of the translucent sheet material and having a second pattern repeatedly formed with a predetermined pitch;

wherein the first pattern and the second pattern are formed with irregularities each having a rectangular section.

16. The decorative sheet according to claim 13, wherein the first designed portion is produced by forming the first pattern on one surface of a second translucent sheet, and the second designed portion is produced by forming the second pattern on one surface of a third translucent sheet.

17. A decorative sheet having a three-dimensional effect, comprising:

a translucent sheet material;

a first designed portion formed on one surface of the translucent sheet material and having a first pattern repeatedly formed with a predetermined pitch; and a second designed portion formed on the other surface of the translucent sheet material and having a second pattern repeatedly formed with a predetermined pitch;

wherein a predetermined picture is formed on a front and back surface of the first designed portion, the second designed portion or the translucent sheet material.

18. The decorative sheet according to claim 14, wherein the second pattern is formed by printing a moire pattern produced by using the first pattern.

19. The decorative sheet according to claim 14, wherein the first designed portion is produced by printing the first pattern on one surface of the translucent sheet material, and the second designed portion is produced by printing the second pattern on the other surface of the translucent sheet material.

20. The decorative sheet according to claim 15, wherein the first designed portion is produced by forming irregularities, each having a rectangular section, in the shape of the first pattern in a plan view on one surface of the translucent sheet material, and the second designed portion is produced by printing the second pattern on the other surface of the translucent sheet material.

* * * * *